United States Patent

[11] 3,558,816

[72] Inventor Richard S. Wise
Boulder, Colo.
[21] Appl. No. 619,223
[22] Filed Feb. 28, 1967
[45] Patented Jan. 26, 1971
[73] Assignee Ball Brothers Research Corporation
Boulder, Colo.
a corporation of Colorado

[54] AUTOMATIC GAIN CONTROL VIDEO AMPLIFIER
24 Claims, 17 Drawing Figs.

[52] U.S. Cl. 178/7.2, 325/404
[51] Int. Cl. H04n 5/52
[50] Field of Search 178/7.2, 7.1DC, 6AVC, 7.3DC, 7.2E; 325/404, 405, 411, 158, 159, 408, 409

[56] References Cited

UNITED STATES PATENTS

| | | | |
|---|---|---|---|
| 3,207,998 | 9/1965 | Corney et al. | 178/7.3DC |
| 3,324,405 | 6/1967 | Corney | 178/7.3DC |
| 2,275,389 | 3/1942 | Feldman | 325/404 |
| 2,881,427 | 4/1959 | Huber | 178/7.2 |

*Primary Examiner*—Richard Murray
*Assistant Examiner*—Alfred H. Eddleman
*Attorney*—Campbell and Harris

ABSTRACT: A device providing channel separation of a video signal with the video on one channel being held at unity gain and the gain of the video on the other channel being controlled by an AGC circuit, the video on said channels being recombined thereafter to provide a composite video output signal. The device automatically compensates for video level variations by adjusting the amplitude of peak-white to peak-black video, and at the same time, adjusts video setup to maintain a uniform video output signal. A memory circuit is also incorporated for providing unity gain during absence of an incoming video signal.

Figure 1:
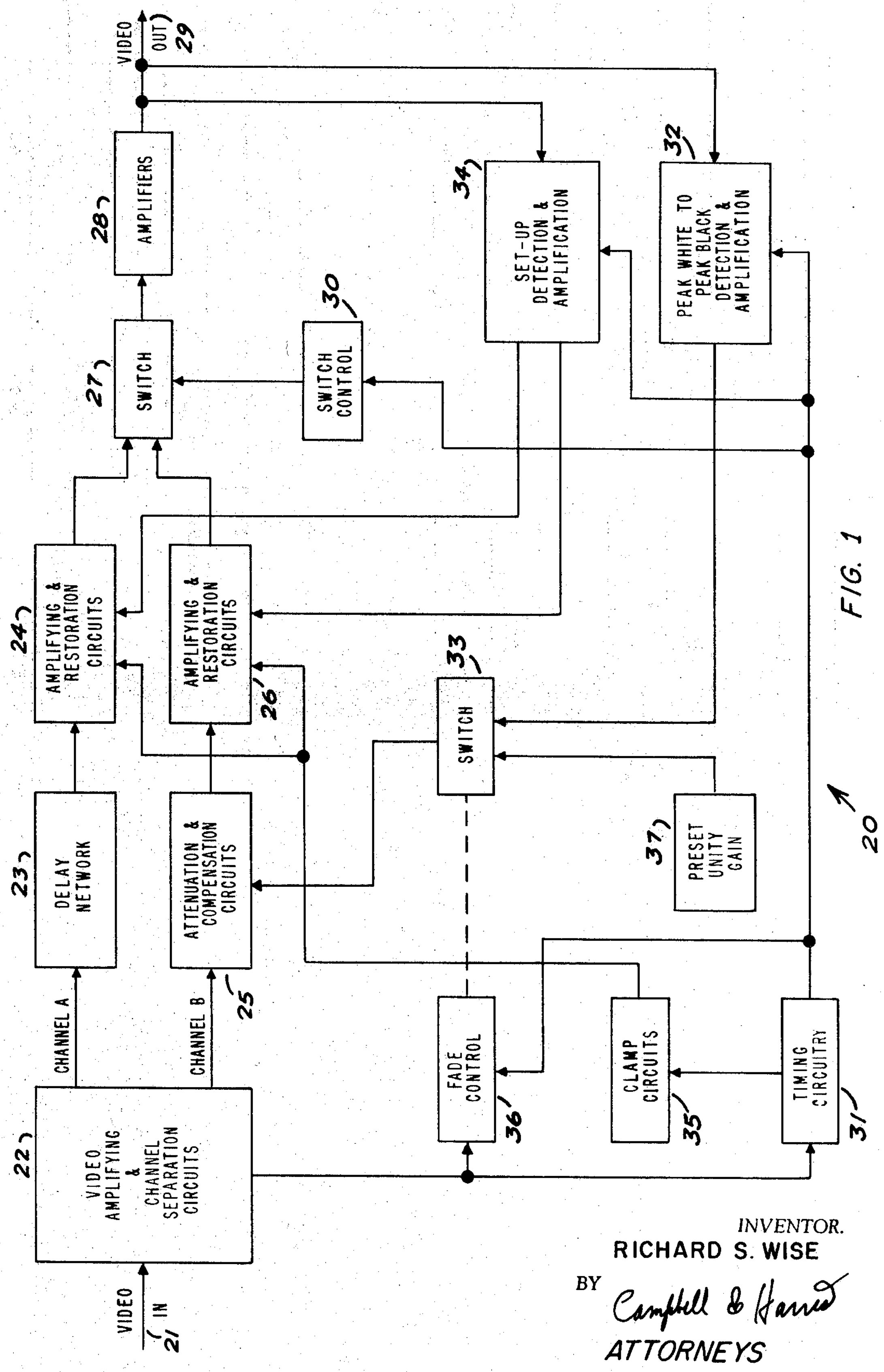

INVENTOR.
RICHARD S. WISE

BY Campbell & Harris

ATTORNEYS

INVENTOR.
RICHARD S. WISE
BY
Campbell & Harris
ATTORNEYS

INVENTOR.
RICHARD S. WISE
BY
Campbell & Harris
ATTORNEYS

INVENTOR.
RICHARD S. WISE
BY
Campbell & Harris
ATTORNEYS

INVENTOR.
RICHARD S. WISE
BY *Campbell & Harris*
ATTORNEYS

INVENTOR.
RICHARD S. WISE

BY *Campbell & Harris*
ATTORNEY

INVENTOR.
RICHARD S. WISE
BY Campbell & Harris
ATTORNEYS

INVENTOR.
RICHARD S. WISE
BY Campbell & Harris
ATTORNEYS

INVENTOR.
RICHARD S. WISE
BY
Campbell & Harris
ATTORNEYS

INVENTOR.
RICHARD S. WISE

BY *Campbell & Harris*

ATTORNEYS

INVENTOR.
RICHARD S. WISE
BY
Campbell & Harris
ATTORNEYS

INVENTOR.
RICHARD S. WISE
BY Campbell & Harris
ATTORNEYS

INVENTOR.
RICHARD S. WISE
BY
Campbell & Harris
ATTORNEYS

INVENTOR.
RICHARD S. WISE
BY Campbell & Harris
ATTORNEYS

INVENTOR.
RICHARD S. WISE
BY Campbell & Harris
ATTORNEYS

AUTOMATIC GAIN CONTROL VIDEO AMPLIFIER

This invention relates to an automatic gain control video amplifier and, more particularly, to such a device for controlling the gain of one portion of a video signal while preserving a second portion at unity gain and also controlling video setup of the combined video output signal thus produced.

It is oftentimes desirable to automatically control a video signal with respect to output signal level and thereby eliminate the need for operator attention. Such is the case, for example, in television originating equipment.

While automatic gain control devices in general are well known in the electronic art, and while such devices have been heretofore suggested and/or utilized to control the gain of one or more video signals, no such device has heretofore been known or utilized which is capable of controlling the gain of one portion of a received video signal while maintaining unity gain of another portion, and, at the same time, automatically adjusting video setup to thereby maintain a uniform video output signal.

In the field of television, for example, it is desirable to automatically control the gain from the video-black to video-white peaks occuring during the active scan of each line while passing sync and color burst at unity gain during the blanking interval. By so doing along with automatic setup adjustment, it is possible to follow film chains and live cameras or network orginations, as well as limiting signals to precise levels to prevent distortion when the output video signal is coupled to tape recorders and/or standard transmission lines. It is a feature of this invention that this video signal control device is particularly well suited for these purposes.

In addition, no fully acceptable device has been found to automatically prevent excessive gain in the amplifier when no video signal is present. Likewise, no fully acceptable device has heretofore been found for providing suitable gating means for positive sampling of the video signal at predetermined times to assure monitoring of peak-white and peak-black to thus achieve proper signal control.

It is therefore an object of this invention to provide a signal control device for automatically controlling gain and adjusting setup of a video signal.

It is another object of this invention to provide an automatic signal control device for controlling the gain of one portion of a video signal while maintaining the other portion at unity gain.

It is still another object of this invention to provide an automatic gain control video amplifying device capable of controlling both gain and setup of a video signal.

It is still another object of this invention to provide an automatic gain control video amplifying device suitable for use in providing automatic gain control of the active video scan of a television signal while maintaining the blanking interval at unity gain to thereby control the gain of peak-white and peak-black video while at the same time passing sync pulses and color burst at unity gain.

It is yet another object of this invention to provide an automatic video signal control device that maintains a constant video peak-white to peak-black output level over a broad range.

It is still another object of this invention to provide an automatic gain control device that is capable of sensing the absence of incoming video signals and establishing unity gain to prevent excessive gain during the absence of said incoming video signal.

It is another object of this invention to provide an automatic signal control device wherein a video signal is sampled at predetermined times to assure proper signal control.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the herein disclosed invention are meant to be included as come within the scope of the claims.

The accompanying drawings illustrate one complete embodiment of the invention according to the best mode so far devised for the practical application of the principles thereof, and in which:

FIG. 1 is a block diagram of the automatic gain control video amplifying device of this invention;

FIGS. 2 through 5 taken together form an expanded block diagram of the invention shown in abbreviated block form in FIG. 1; and FIGS. 6 through 17 are schematic diagrams of this invention as illustrated in the block diagram in FIGS. 2 through 5.

Referring now to the drawings in which like numerals have been used for like characters throughout, the numeral 20 refers generally to the automatic gain control video amplifying device of this invention which is shown in the abbreviated block diagram of FIG. 1. An incoming video signal, which can be, for example, a television signal having sync pulses and possible color burst on the blanking portion and intelligence information on the active scan, as is well known in the art, is coupled by lead 21 to the video amplifying and channel separation circuits, indicated in FIG. 1 by the numeral 22. The video amplifying and channel separation circuits are utilized to amplify the incoming signal and separate the incoming signal into two channels, designated in FIG. 1 as A and B.

The video signal in channel A, which is utilized for isolation, is coupled through a delay unit 23 to amplifying and DC restorer unit 24 with the signal being held to unity gain. The video signal on channel B, on the other hand, is coupled through attenuator and compensation circuit 25 to amplifying and DC restorer unit 26 with the signal having a net gain that can be varied approximately ± 8 decibels, said gain being controlled by an AGC control signal applied to the attenuator as brought out hereinafter.

As best shown in FIG. 1, the output signals from amplifying and DC restorer units 24 and 26 are coupled to switch 27 where the signals are combined, amplified by amplifiers 28, and the combined video output signals coupled from the device on lead 29. Switch 27 is controlled by switch control 30, which is controlled, in turn, by timing circuitry 31, so that the video in channel A is passed during the blanking interval, while the video in channel B is passed during the remaining period, which is the period of active video.

Since the level of video in channel A is at unity gain, sync and color burst are passed at unity gain, while the video appearing during the active video is controlled in channel B. AGC control is provided by feedback through peak-white and peak-black detection and amplifier unit 32 (which also receives an input from timing circuitry 31) coupled through switch 33 to attenuator and comparator circuit 25, and the video on channel B is adjusted to the amplitude appropriate for gaining the desired video peak-white to peak-black signal level.

Control of video setup is provided by feedback through setup detector and amplification unit 34, which likewise receives an input from timing circuitry 31. DC outputs from setup detector and amplification unit 34 are coupled to amplifying and restorer units 24 and 26 to provide push-pull DC control voltage to clamp, or reference, the video signals in channel A and channel B to different DC levels so that the switched composite, or combined, output signal will thus have more or less setup depending upon the DC reference voltage applied. In addition, an output is coupled from clamp 35 to amplifying and DC restorer units 24 and 26, clamp 35 receiving an input from timing circuitry 31.

A video output signal from video amplifying and channel separation unit 22 is also coupled to fade control unit 36, which unit controls switch 33 so that when the incoming video signal fades below a predetermined threshold, switch 33 is operated to connect attenuator and compensation circuit 25 to preset unity gain unit 37. This causes channel B to have unity gain whenever no incoming video signal is present and guards against excessive gain in the device.

Turning now to the expanded block diagram of FIGS. 2 through 5, the incoming video signal on lead 21 is applied to differential amplifier 40 of video amplifying and channel separation circuits 22 (FIG. 1). After the signal is amplified, it is applied to emitter follower 41. The output signal from emitter follower 41 is coupled back to differential amplifier 40 so that a feedback type amplifier is utilized. A DC current generator 42 is provided to replace the emitter resistor commonly associated with a differential amplifier. The overall gain of this amplifier is approximately 8 db or a voltage gain of 2.5.

Figure 2:
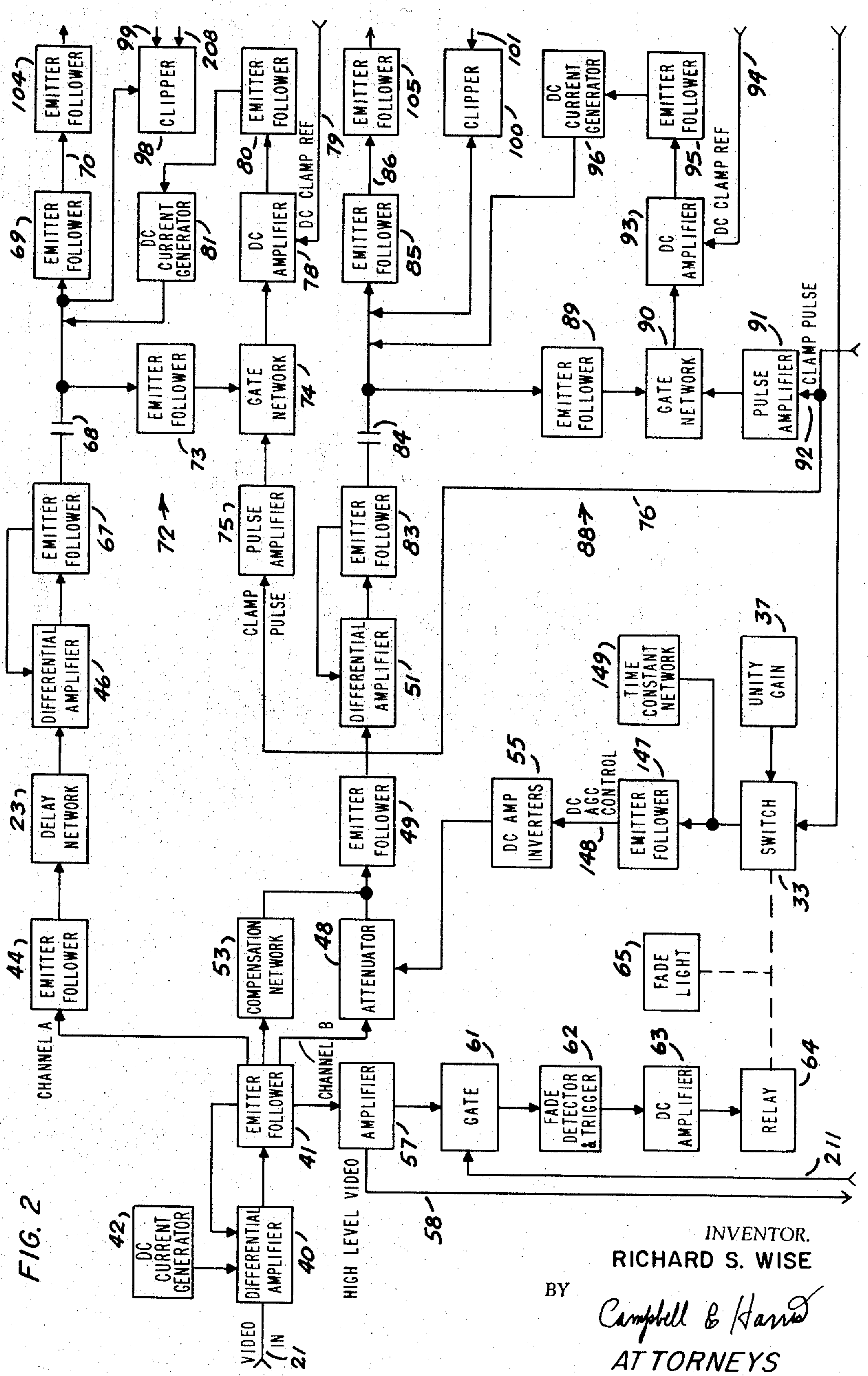
Figure 3:
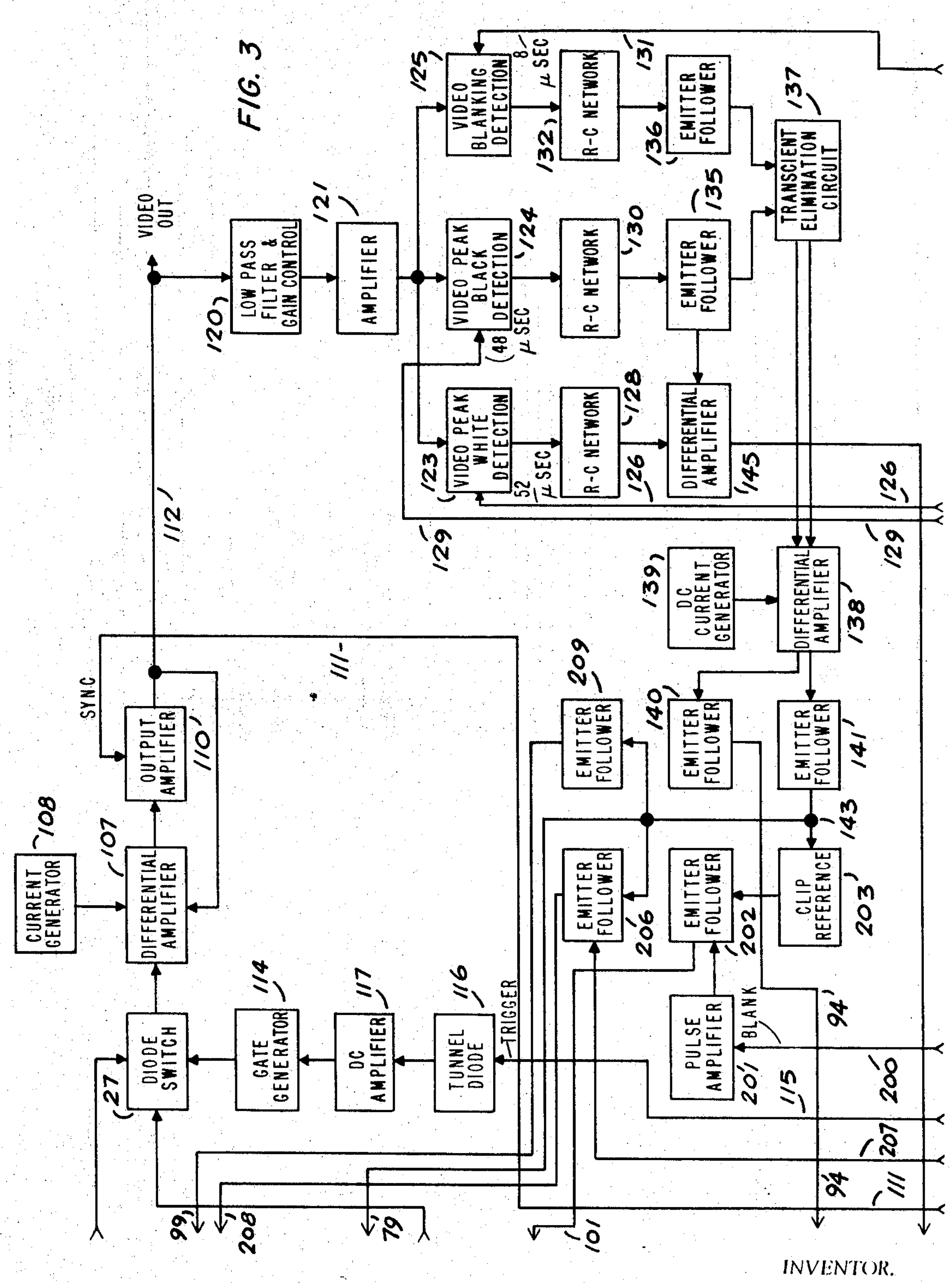

The output of emitter follower 41 is applied to several circuits, as shown in FIG. 2. The first of these output video signals is applied to emitter follower 44. The voltage level at this point has been divided down so that it is approximately the same level as the incoming video signal on lead 21. The output of emitter follower 44 is next applied to delay line 23. This delay line is designed so that the time delay in channel A will be equal to the time delay in video channel B. The output of the delay network 23 is applied to differential amplifier 46 of amplification and DC restoration circuit 24.

The second output signal from emitter follower 41 is applied to raysistor attenuator 48. This raysistor attenuator has an approximate attenuation range of 0 to 15 db. The output of the raysistor attenuator circuit 48 is next applied to emitter follower 49 and thence to differential amplifier 51 of amplifying and DC restoration circuit 26. This video signal is identified as the AGC'D video for channel B. The level or amplitude of this video signal varies from approximately +8 db to −8 db with respect to the incoming video on lead 21. Preferably, controls (not shown) may be accessibly mounted to limit the dynamic range of the raysistor attenuator circuit to something less than ±8 db.

The third output of emitter follower 41 is applied to compensation network 53 which provides that the time delay of the raysistor attenuator 48 will be constant at all attenuation levels.

The raysistor attenuator 48 is controlled, or varied, by means of a DC voltage applied to the attenuator through amplifier 55 which is used to control the current through the filament of the raysistor attenuator. The range of the incoming DC voltage applied to said filament varies from approximately +7 to +12 v. DC The +12 v. DC corresponds to maximum attenuation and the +7 volts DC corresponds to the minimum attenuation, i.e., the maximum output video signal.

The fourth output from the emitter follower 41 is applied to amplifier 57. This amplifier has a voltage gain of approximately three. The output of this amplifier is coupled through lead 58 to emitter follower 59 of timing circuitry 31 and to gate 61 of fade control unit 36, the former being identified as high level video out with an output level of approximately 10 times the voltage level of the incoming video signal.

The output of the gate circuit 61 is then applied to fade detector circuit 62. The gate circuit 61 is used to pass the entire video signal or to gate out any vertical interval test signals which may be present. Fade detector circuit 62 includes a peak-to-peak detector circuit and a schmidt trigger circuit (not shown in FIG. 2). These circuits are utilized to sense a video fade-to-black level. Normally, (without any video signal present) the DC voltage of the detector is approximately zero, and the schmidt trigger is in such a state that a DC voltage out is supplied. When the video level rises until the schmidt trigger is triggered, the DC voltage out is disrupted so that the AGC system can go into normal operation. In the event the video level falls below a certain level or threshold, the schmidt trigger is triggered back into its original state so that a DC voltage out is once again supplied to discontinue normal AGC and switch in unity gain. The threshold level of this schmidt trigger can be varied to select the threshold between the limits of approximately 0.2 v. to approximately 1 v. peak-to-peak video by means of a potentiometer (not shown) mounted in an accessible location. The DC control voltage out is coupled through DC amplifier 63 to relay circuit 64, which circuit controls fade light 65 and switch 33.

The video signal coupled to differential amplifier 46 is coupled therefrom to emitter follower 67. There is a feedback path from emitter follower 67 to differential amplifier 46 which limits the voltage gain to approximately a factor of 2 and also provides a low output impedance. The video is then coupled through capacitor 68 to emitter follower 69. Emitter follower 69 provides a video output on lead 70 having a low output impedance.

A DC restoration circuit 72 is provided between capacitor 68 and emitter follower 69. This circuit includes an emitter follower 73 which acts as an isolation amplifier. The output from emitter follower 73 is coupled to a diode gate network 74 which gate is opened by means of a gate pulse from the pulse amplifier 75. The timing of this incoming pulse (on lead 76) is such that it occurs immediately after the sync pulse, i.e., during the back porch interval. The diode gate network 74 supplies a DC output which is equivalent to the DC level of the video back porch, which DC signal is fed to DC amplifier 78. The second DC input to DC amplifier 78 is on lead 79 and is a reference voltage (setup control) which is approximately 6 v. DC amplifier 78 compares the two DC inputs and provides a DC error voltage which is supplied through emitter follower 80 to DC current generator 81. This current is supplied to the right side of capacitor 68 and is of a proper polarity which can cancel or subtract any low frequency tilt or 60 cycle hum which may be in the video signal. The circuit acts continuously during the entire line interval to cancel out any extraneous components rather than during a very brief interval such as does conventional keyed clamp circuits.

Channel B is similar to channel A and operates in the same manner. The output from differential amplifier 51 is coupled through emitter follower 83, capacitor 84 and emitter follower 85 to lead 86. The DC restorer circuit 88, in like manner, includes an emitter follower 89, gate 90, pulse amplifier 91 (receiving a pulse on lead 92), DC amplifier 93 (receiving DC setup control voltage on lead 94), emitter follower 95, and DC circuit generator 96.

In the case of channel A, a clipper 98 (receiving an input on lead 99) is used to clip peak whites, while in the case of channel B, a clipper 100 (receiving an input on lead 101) is utilized to clip only during the blanking interval by means of a voltage gate.

The video signals on lead 70 from channel A and lead 86 from channel B are coupled through emitter follower 104 and 105, respectively, to diode gate, or switch, 27. This gate is operated in such a manner that either the video on channel A or the video on channel B is passed. The output from diode gate circuit 27 is applied to differential amplifier 107, having DC current generator 108 connected thereto to replace the conventional emitter resistor commonly used in a differential amplifier. The output of differential amplifier 107 is coupled to output amplifier 110. The output of amplifier 110 is fed back to differential amplifier 107 to minimize distortion and to provide a low output impedance from the video amplifier. Provision is made to add in sync on lead 111 and the video output signal is coupled from the amplifier on lead 112.

The output from gate generator 114 coupled to switch 27 determined whether channel A video or channel B video appears at the output amplifier 110. The trigger-in (on lead 115) is first applied to tunnel diode 116. The output of the tunnel diode is applied to DC amplifier 117, the output from which is coupled over to gate generator 114. This circuit is similar to a multivibrator inasmuch as the gates out of the circuit are of opposite polarity to one another. This insures that when channel A is gated open, channel B will be closed, and vice versa. In this respect, the diode gate circuits actually operate as a single-pole double-throw switch with the relay clapper arm switching between video A and video B, and the output of the clapper arm being supplied to the differential amplifier circuit. The elements 114, 116, and 117 then act as the armature for this single-pole double-throw relay type of switch. Since the trigger applied on lead 115 is actually composite blanking, video in channel A will be passed during the blanking interval whereas channel B video will be passed at all other times.

The video output signal on lead 112 (which video should have a normal amplitude at this point of approximately 2 v. peak-to-peak for composite and approximately 1.4 v. peak-to-peak for noncomposite video) is coupled through low pass filter and gain control 120 to amplifier 121 which has a voltage gain of approximately 3 and has a relatively low output impedance.

Three gated detector circuits 123, 124, and 125 are used to find or establish the active video peak white DC level, the active video peak black DC level, and the video blanking DC level, respectively. Gated detector 123, used to sense the active video peak white DC level, is energized by means of a 52 $\mu$sec. positive gate pulse which is supplied on lead 126. This gated detector circuit 123 gates out all other extraneous video signals except the peak whites appearing during the active video line. The output of the gated detector circuit is a DC voltage which is coupled to R–C network 128.

Gated detector circuit 124 is used to sense or establish the active video peak black DC level. This detector circuit is energized by means of a 48 $\mu$sec. negative gate which is supplied on lead 129. This 48 $\mu$sec. gate occurs only during the active video scan; it does not occur during the field blanking period. The output of the detector circuit 124 is a DC voltage which is coupled to R–C network 130.

Gated detector circuit 125 is used to detect the video blanking DC level. To enable this detector to sense only the DC level equivalent to video blanking, an 8 $\mu$sec. positive gate pulse is applied on lead 131. Since this 8 $\mu$sec. positive gate pulse occurs only during the line blanking period, the video peaks occurring during the active video line is open circuited so that they have no effect upon the detector. The DC output of the gated detector 125 is coupled to R–C network 132.

The output voltage from R–C network 130 is applied to emitter follower 135, and the DC voltage from R–C network 132 is applied to emitter follower 136. The DC output voltage of emitter follower 135 is then coupled through transient eliminator circuit 137 to differential amplifier 138. Next, the DC output voltage of emitter follower 136 is coupled through the transient eliminator circuit and applied to the other side of differential amplifier 138.

The DC voltage applied to differential amplifier 138 correspond to the DC level of the active video peak black and the DC level of active video blanking signal. The current to the differential amplifier is supplied by DC current generator 139. This permits the differential amplifier to operate over a wide dynamic voltage swing, but it will not affect the output currents. In other words, the differential amplifier has a high rejection ratio to any common mode input voltages. The output voltages of the differential amplifier are coupled through emitter followers 140 and 141 to leads 94 and 143, respectively. These two voltages are applied as a DC reference voltage to DC restoration circuits 72 and 88 for channel A and channel B video, respectively, and hence control the setup on the video signal.

Differential amplifier 145 is used to provide an error signal for attenuator 48. The DC voltage from R–C network 128 is coupled to differential amplifier 145 as is the DC voltage from emitter follower 135. These two DC voltages applied to the differential amplifier represent the DC level of the video peak white signal and the DC level of the active video peak black signal. The output signal from differential amplifier 145 is coupled through switch 33, emitter follower 147, lead 148, and amplifier 55 to the attenuator network 48 in channel B. Time constant network 149 provides five possible AGC time constants which may be selected for optimum operation of the AGC amplifier.

In the event of a fade-to-black level, the fade detector 62 senses this fade by means of a threshold circuit or schmidt trigger. When this schmidt trigger is energized, a DC signal is supplied through amplifier 63 to relay 64 as brought out hereinabove. It is also possible, if desired, to shift a DC voltage applied to differential amplifier 138 from emitter follower 136 to maintain a specific setup voltage during a video fade-to-black. This specific setup voltage can be adjustable by means of a potentiometer so that it can be adjusted from zero to approximately 10 percent to accommodate various operating conditions.

Timing circuitry 31 depends, for basic timing, on a 31.5 kc. sine wave oscillator 152. The frequency of this oscillator can be varied approximately ±10 percent by means of a reactance modulator circuit 153.

The signal output of the 31.5 kc. sine wave oscillator 152 is coupled out and applied to micrologic two-stage overdriven amplifier 154. This two-stage amplifier amplifies and squares the sine wave so that a 31.5 kc. square wave is available. This square wave signal is applied to lead 155 and also applied to micrologic divide-by-two flip-flop multivibrator 156 which changes state on the negative-going transition of the input signal only. The positive-going transition of the input signal has no effect. The net result is that a 15.75 kc. square wave is generated at each of two output terminals one of which is connected to an 11 $\mu$sec. one-shot multivibrator 157 the output of which is used as an inverted line blanking signal, and the other of which is connected to micrologic one-shot multivibrator 158.

A third output from divider 156 is also a 15.75 kc. square wave which is applied to a delay multivibrator 160. The purpose of this delay multivibrator is to generate a delay which can be varied by means of a potentiometer (not shown in FIG. 4) between 1.5 and 3.5 $\mu$sec. The output pulse of this delay multivibrator is applied to one-shot multivibrator 161. The output of multivibrator 161 is a 25 $\mu$sec. gate which occurs at a repetition rate of 15.75 kc. This gate then is applied to time discriminator 162. The other signal input to the time discriminator is obtained from the inverter amplifier 163, which supplies a pulse related to the sync on the incoming video signal through one-shot multivibrator 158.

The composite incoming video signal is applied to emitter follower 59. Here, the signal is converted to a low impedance signal necessary to drive sync clipper circuit 165. Since the video input signal to emitter follower 59 may vary from approximately 3 to 20 v. peak-to-peak, it is necessary to vary the DC bias supplied to sync clipper 165 to provide optimum sync clipping over this wide dynamic range. This function is provided by bias current generator 166, which senses the peak-to-peak video signal and varies the DC bias current to sync clipper to compensate for amplitude variations of the video input signal.

The output from sync clipper circuit 165 is applied to inverter amplifier 168, the output of which is composite sync out which is applied to lead 169. The other output of sync clipper 165 is applied to micrologic 2 $\mu$sec. one-shot multivibrator 158, the leading edge triggering the same. There is also a second input signal to multivibrator 158 obtained from divider 156, which signal is used to gate out alternate pulses during the vertical blanking interval to prevent the 2 $\mu$sec. one-shot multivibrator from triggering at twice line rate.

The 2 $\mu$sec. pulse out of multivibrator 158 is then applied through pulse amplifier circuit 163 to time discriminator 162. The time discriminator compares the timing of the inverted line blanking signal with the leading edge of the synchronizing pulse on the video and produces a DC output error signal which is coupled through emitter follower 171 to reactance modulator 153 to correct the frequency of the 31.5 kc. sine wave.

The 31.5 kc. clock pulse is applied to micrologic divide-by-two circuit 174, then the output of circuit 174 is applied to divide by 2 circuit 175, the output of circuit 175 is applied to divide by 2 circuit 176, etc., through divide-by-two circuits 177, 178, 179, 180, 181, 182 and 183. Each of these micrologic circuits functions as a divide-by-two binary counter. It should also be noted that other waveforms or gates are taken off these micrologic divide-by-two counters and applied to dual two-input gate circuits 184 and 185.

The 31.5 kc. clock pulse, which is actually a square wave, provides line synchronization for the counter chain. However, to provide field synchronization, composite sync from lead 169 is utilized to preset the entire chain of micrologic divide by 2 circuits. The composite sync signal is applied to inverter integrator circuit 188. This circuit detects the arrival of the vertical sync pulse and triggers one-shot multivibrator 189. The leading edge of the one-shot multivibrator is differentiated and is used as a positive-going preset pulse. This positive-going preset pulse occurs approximately 15 μsec. after the leading edge of the vertical sync pulse. The preset pulse is coupled through emitter follower 190 and is then applied to micrologic divide-by-two circuits 174—183; this presets these 10 counter circuits to an initial condition.

After the preset pulse, the micrologic divide-by-two circuits begin their normal binary countdown which continues until the next preset pulse, which will be initiated by the next vertical sync pulse.

To determine when the vertical field blanking period should end, micrologic and vertical blanking gate circuit 185 is utilized. Optional jumpers can be utilized, as shown by dotted lines in FIG. 4, if desired. In this block diagram, the optional jumpers are connected for a 21 line blanking interval which is illustrated by the solid lines between the optional jumper points. The dotted jumper lines indicate the hookup required for other line blanking intervals. Gate circuit 185 generates a signal only when the input gate signals applied at the three inputs are all simultaneously in the low state or digital 0. When these three input signals all go low or digital 0, then all the internal transistors in circuit 185 are biased below cutoff such that a positive-going signal is generated at the collectors. This positive step is applied to micrologic field blanking bistable multivibrator circuit 186. To detect the instant the vertical field blanking period should begin, micrologic begin vertical blanking gate circuit 184 is utilized. Circuit 184 requires four input gate signals. When these four input gates all go to digital 0 (low state) simultaneously, then a positive-going voltage is generated. This positive voltage is then applied to bistable multivibrator micrologic circuit 186.

Reviewing the circuit operation thus far, field blanking bistable multivibrator 186 is triggered into one state by a signal derived from circuit 184 and triggered into the opposite state by a signal derived from circuit 185.

The output of micrologic circuit 186 is coupled to micrologic field blanking and line blanking gate circuit 188'. It should be noted that this waveform is actually inverted field blanking; i.e., the field blanking is a positive-going gate. Circuit 188' also has a second signal which is coupled thereto from one-shot multivibrator 157. This second signal is inverted line blanking. The inverted line blanking signal and the inverted field blanking signal are then added together in circuit 188'. Consequently, the output of circuit 188' becomes composite blanking which is thus a negative-going signal identical to the normal composite blanking except the amplitude is about 2 v. or slightly less. Furthermore, the width of the field blanking is either 17, 21 or 23 lines depending upon the jumpers used. This signal is coupled from circuit 188' on lead 190'.

Figure 4:
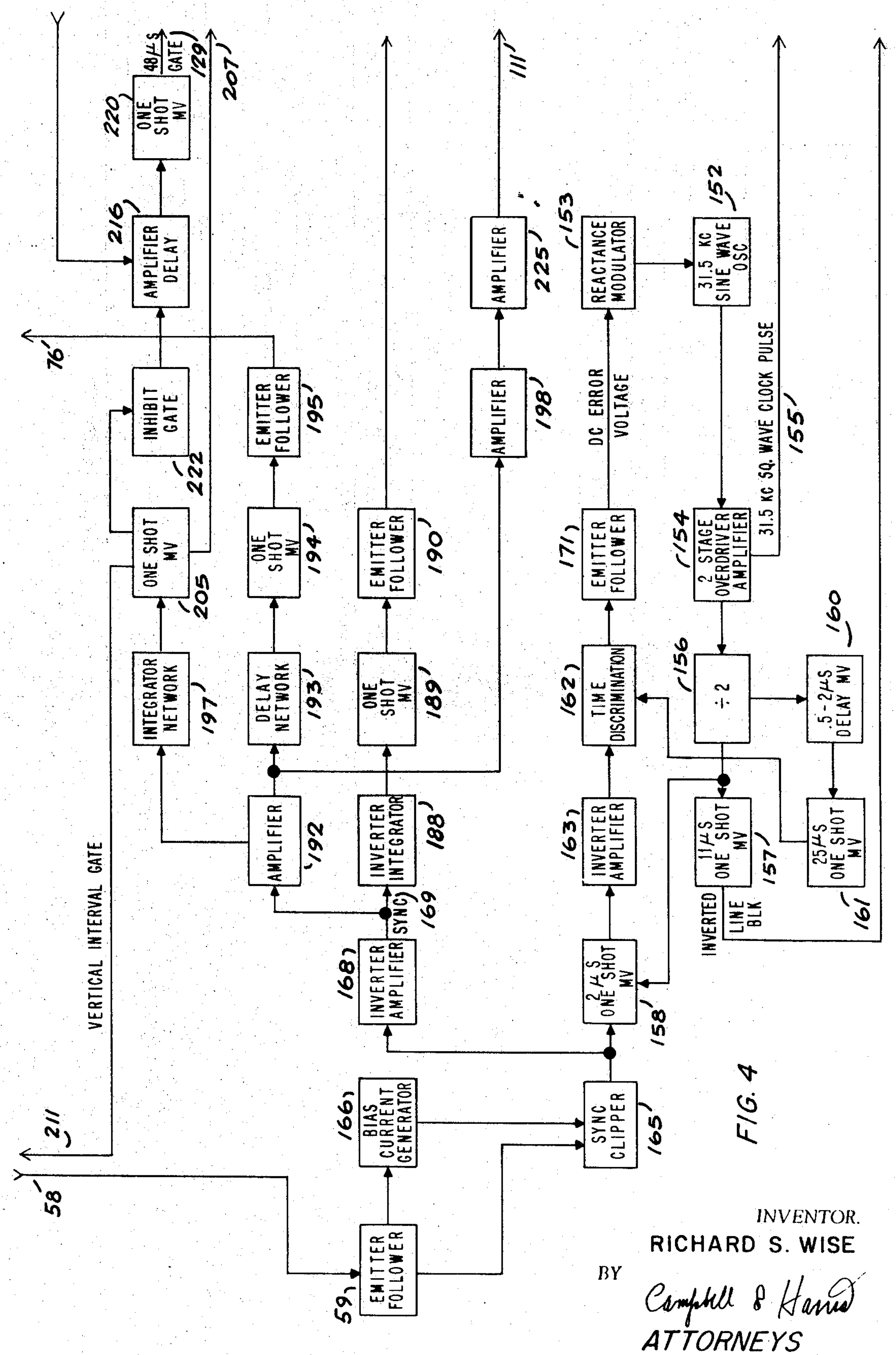
Figure 5:
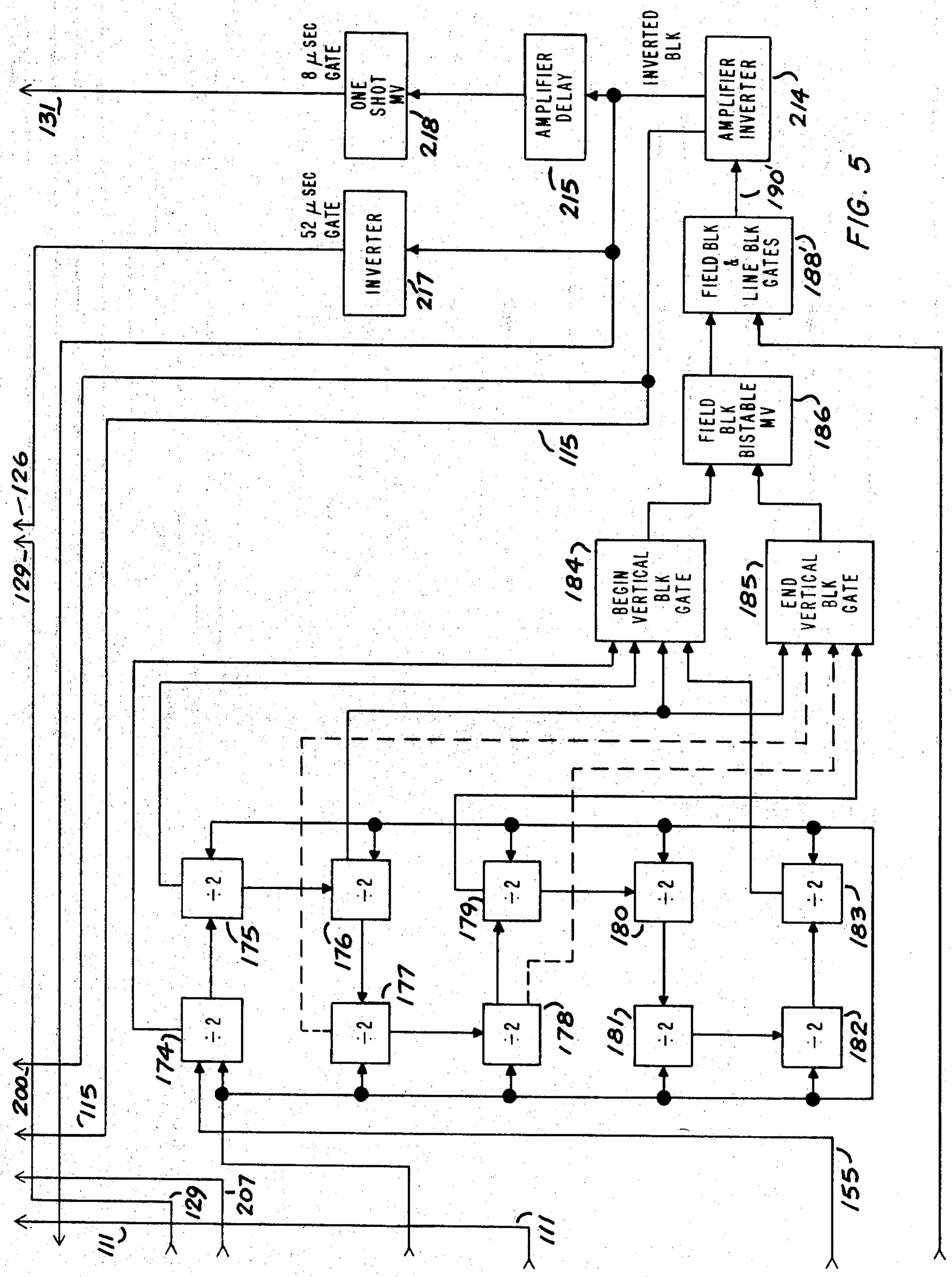

Amplifier 192 is used as an amplifier for the sync signal from lead 169. The output of amplifier 192 is an inverted sync signal which is applied to 0.05 μsec. delay network 193. The output of the delay network is next differentiated and used to trigger one-shot multivibrator 194. This multivibrator triggers on the trailing edge of the sync pulse so that a 3 μsec. gate is generated during the back porch interval of the video waveform. The output of the multivibrator is then applied to emitter follower 195 where it is converted to a low impedance and then coupled out as a clamp signal on leads 76 and 92. Amplifier 192 also supplies a second output signal which is the same as the original sync input signal. This signal is applied to integrator network 197 as well as amplifier 198. In addition, by completing an optional bus wire jumper (as shown in FIG. 4 in dotted lines), the sync signal can be coupled to sync out where it is used to stretch the sync signal on the incoming video waveform.

A second input blanking signal is also utilized. This signal is coupled in on lead 200 and is amplified and inverted by pulse amplifier 201. The inverted blanking signal is then applied to emitter follower 202. Clip reference 203 has a DC input reference coupled thereto on lead 143. Clip reference 203 is used as a positive limiter or clipper such that the output of emitter follower 202 appears as a clipped inverted blanking signal, except that the line blanking interval is approximately 1 μsec. longer than the original blanking signal. The positive portion of this waveform is clipped at a specific DC level which is determined by clip reference 203 and the DC clamp voltage coupled on lead 143.

The composite sync signal out of amplifier 192 is applied to integrator network 197. This network develops a negative-going output shortly after the vertical sync pulse comes in. This negative pulse is used to trigger one-shot multivibrator 205. The output of this multivibrator is a positive-going pulse which lasts approximately for the remaining vertical blanking interval. The waveform is next applied to emitter follower 206 through lead 207; here, it is referenced to a specific DC level and then coupled out on lead 208 to be used as a video white clipper at channel A. The positive pulse which occurs during the vertical blanking interval permits any VITS signals to pass through this channel without any clipping (or other distortion).

Emitter follower 209 is used in such a way that the output voltage is referenced to the DC clamp voltage appearing on lead 143. This DC potential, which is on lead 99, is applied to channel A to clip sync at the desired DC level.

An additional output signal, the vertical interval gate, is generated by one-shot multivibrator 205, except that the amplitude is approximately 2 v. peak-to-peak. This signal is coupled out on lead 211 cards of the AGC amplifier.

It should be noted that three of these outputs are all referenced to a specific DC level which is applied through lead 143. This is referenced to the DC voltage of the (video back/porch) appearing at the video output. In normal operation, the DC level of the video back porch shifts up and down, as the DC reference likewise shifts. This permits the signals used for clipping to move in a similar manner; thus, the waveforms are always clipped with reference to the back porch DC level.

Composite blanking on lead 190' is applied to amplifier inverter circuit 214. This amplifier supplies two output signals. The first, composite blanking to leads 115 and 200, and the second, inverted blanking, is supplied to amplifier delays 215 and 216 and inverter 217. Amplifier delay 215 is used to provide a delay of approximately 1.5 μsec. and is then used to trigger a one-shot multivibrator 218. The output of this one-shot multivibrator is then supplied to lead 131. This signal is an 8 μsec. positive gate which occurs during the line blanking period. The inverted blanking waveform is also supplied to amplifier delay 216 which is used to create a delay of approximately 2 μsec. and then supply a trigger to the one-shot multivibrator 220. The output of this one-shot multivibrator is supplied to lead 129. This waveform is a 48 μsec. negative gate out which occurs only during the active video line. This waveform is interrupted during the vertical blanking interval as well as during one or two lines thereafter.

Furthermore, the inverted blanking waveform is coupled to inverter amplifier 217. The output of inverter 217 is supplied to lead 126. This waveform is a 52 μsec. positive gate out that occurs during the active video line. The optional jumper permits the operator to include or reject the vertical interval test signals within the AGC envelope. When the jumper is connected, the vertical interval test signals are not included within the AGC envelope. Conversely, when a continuous or DC gate out is supplied in such a way that the detectors in the gated detector card sense the white peaks of the active video picture as well as the VITS signal.

A second input signal, the vertical interval gate on lead 211, is coupled to inhibit gate 222 by means of an optional jumper. This signal is then applied to amplifier delay 216. When this optional jumper is complete, the one-shot multivibrator 220 is inhibited or disabled during the entire field blanking period so that no output pulse is generated until the active video scan begins. This allows the gated detector card to sense only the video peak blacks occurring during active picture and to reject the video blacks which occur during the time of the VITS signals.

Composite sync supplied from amplifier 192, is coupled through amplifiers 198 and 225 and lead 111 to output amplifier 110. Amplifiers 198 and 225 act as a slicer type of circuit so that the rise and fall time of the sync pulses are sharpened or steepened up. The output from amplifier 225 is a high output impedance and should not appreciably change the output impedance of the equipment on which it is used.

FIGS. 6 through 19 are schematic diagrams of this invention. These diagrams are described hereinafter only insofar as deemed appropriate for an understanding of the invention.

The video incoming video signal on lead 21 is applied to the base of transistor 265. The signal is then coupled from the emitter of transistor 265 over to the emitter of transistor 267 and amplified without inversion in the collector of transistor 267. When this has occurred, the signal is applied to emitter follower 41. The feedback path within the amplifier for the video signal is from the voltage divider made up of resistors 310 and 314 through zener diode 281 and capacitor 228 through diode 282 to the base of 267. The voltage division ratio determined by resistors 310 and 314 decides the amplitude of the feedback signal and consequently the overall gain of the amplifier circuit. Normally, the voltage gain of the feedback amplifier is approximately three times the input signal. In addition to providing voltage gain, the amplifier also supplies a relatively low output impedance in the order of a few ohms. In order to provide a relatively large voltage swing without serious distortion, the common emitter resistor normally used in the differential amplifier has been replaced by a DC current generator 42 with associated circuitry. Variable capacitor 235 in this amplifier is used to adjust for optimum or a relatively flat video frequency response.

The video signal appearing at the junction of resistors 310 and 314 is coupled out through series resistor 349 and applied to emitter follower 44. This signal is next delayed several nsec. by means of a delay line 23 made up of inductors 261 and 262 and capacitors 250 and 251. Resistors 313 and 352 are used to terminate the delay line as well as adjust the delay precisely to the desired value. The signal is then coupled out through resistor 350.

The video signal from the emitter of 41 is next coupled through inductor 255 through the signal element of a raysistor 48 and over to the base of emitter follower 49. From the emitter of 49, the signal is then coupled out through capacitor 245 and resistor 246. It should be noted that the signal element of the raysistor is shunted by potentiometer 320, inductor 263, and series resistor 322. This shunt network is used to limit the maximum attenuation which the raysistor may offer to the video signal. Normally, up to 15 db attenuation may be provided by the raysistor. However, this maximum attenuation may be reduced by several db by adjustment of potentiometer 320. Since the amplifier provides approximately 8 db gain and the raysistor offers approximately 15 db attenuation, the net attenuation between the video input and video output may be in the order of 7 db. Adjustment of potentiometer 320 thus limits this net attenuation range to 1 or 2 db if desired.

To provide a uniform signal delay across the raysistor attenuator circuit regardless of any specific attenuation, a compensation network 53 made up of transistor 273 and associated circuitry is utilized. The video signal appearing at the emitter of 41 is applied through series resistor 302 to the base of 273. Here the signal is inverted and attenuated. The output signal at the collector of 273 is then coupled through the variable capacitor 236, series resistor 330, and applied to the base of emitter follower 49. The circuit compensates or provides cancellation of high frequency boost caused by the raysistor attenuator. After proper adjustment of capacitor 236, the delay or color subcarrier phase shift should be constant at various attenuation settings of the raysistor element.

The video attenuation offered by the raysistor attenuator is adjusted by means of the DC current through the control element, which in turn is controlled by means of a DC amplifier made up of transistors 275 and 268. The DC control voltage is applied through resistor 329 to the base of transistor 268. Normally, this voltage will vary from approximately +7 v. DC to approximately +12 v. DC In transistor 268 the voltage is amplified and inverted and applied through resistors 323 and 331 to the base of transistor 275. It should be noted that resistor 334 in the emitter circuit of 268 is actually a varistor type of resistor, i.e., a varistor is a nonlinear resistor whose resistance decreases as the voltage across the resistor is increased. This varistor is utilized to compensate for the nonlinear characteristics of the raysistor attenuator. Transistor 275 is used as a DC power amplifier inverter. The collector current from 275 flows through potentiometer 321 and resistor 327 through the control element of the raysistor. The internal circuit operation of the raysistor is of such a nature than an increase of control current causes a decrease of attenuation. For example, by assuming a DC negative step voltage is applied an increase of the current flowing in the collector of 268 is caused and a positive step voltage is applied to the base of 275. This in turn causes an increase of collector current 275. An increase of current through the control element of the raysistor offers less attenuation so that the video amplitude out increases in amplitude. In other words, when +7 v. DC in is applied, the video amplitude out is maximum; whereas, when a +12 v. DC in is applied, the video amplitude out is minimum. Potentiometer 321 is used to limit the control current through the raysistor and consequently limits the amplitude out of the video signal. Normally the net gain of the circuit is in the order of 7 to 8 db. However, should potentiometer 334 be set at maximum resistance, this net gain would be in the order of 1 or 2 db gain. Resistor 327 is specifically selected to insure that the maximum gain is limited to approximately 1 db when panel potentiometer 321 is in the extreme counterclockwise position. This permits the operator to preset or limit the net gain from approximately +1 db to a maximum of +8 db gain by adjusting the potentiometer. Furthermore, resistor 326 is used to limit the maximum net attenuation between the video input and the output to approximately 8 db maximum attenuation with potentiometer 320 in the maximum counterclockwise position. This permits the operator to preset or limit the net attenuation to a value from approximately 1 db to 8 db maximum attenuation.

The video at the emitter of transistor 41 is also applied to resistor 298 and to the base of transistor 269. Transistor 269 and 272 are used as a noninverting video amplifier with a nominal voltage gain of approximately 3.5. One of the video outputs of this amplifier is coupled through resistor 318. Normally, the video level out at this point should be approximately 10 times the amplitude of the incoming video signal.

A video fade to black detector circuit senses when the video fades below a preset level and energizes the proper circuits to restore the AGC amplifier to unity gain. This function is accomplished by applying the video signal at the collector of transistor 272 to resistor 311, capacitor 242, diode 284, and then through emitter follower 276 to diode detector 288. Transistor 270 is used as a DC current generator which supplies a DC current through diode 284 and resistor 296. This DC signal through diode 284 then provides a path for the video from capacitor 242 through diode 284 to the base of transistor 276 which is used as an emitter follower. Diode 287 is used as a diode clamp circuit so that the sync tips or the most negative portion of the video signal is clamped at ground potential. Consequently the video signal is DC coupled through diode 284 and transistor 276 to diode 288, where the positive peaks are detected and capacitor 245 is charged up to this peak video level. The actual DC voltage developed across capacitor 245 should be approximately 10 times the peak-to-peak incoming video signal.

Provision to include or reject VITS signals within the AGC envelope is provided by means of terminals and an optional bus wire jumper. When this optional jumper is connected, the positive vertical interval gate is applied to the video gate circuit made up of transistor 270 and diode 284. Normally, 270 is conducting current continuously so that all signals are applied to transistor 276 and diode 288 (both active video signals and VITS signals). When the vertical interval gate is applied to the base of 270, the DC current generator becomes biased to cut off so that no DC current is flowing through diode 284 and resistor 296. When this happens, diode 284 is open circuited so that no video signals are passed. Since the vertical interval gate occurs during the same interval as field blanking, any VITS signals occurring during this interval are blocked by the gate circuit just described. When the optional bus wire is deleted, DC current generator 270 is then forward biased at all times by diodes 285 and 286, and resistor 341; collector current through diode 284 thus flows continuously. Consequently, all video and VITS signals are applied to detector 288.

A schmidt trigger circuit made up of transistors 277 and 278 is utilized to sense the DC level stored on detector 288 and capacitor 245. Assuming that the video signal has faded to ground level, then the DC voltage on capacitor 245 is at approximately ground or zero DC. Transistor 277 is biased to cut off. A DC current flows through resistor 345 from emitter to collector of 278 and out through resistor 312. This DC current energizes relay 64 so that the AGC amplifier will be placed at unity gain operation. When the video amplitude increases, the DC voltage across capacitor 245 increases so that the current flowing through resistor 345 is shifted from 278 to 277. This cuts off the collector current of 278 to resistor 312. The appropriate relay becomes deenergized and permits the AGC amplifier to go into normal AGC operation. Potentiometer 353 permits the operator to preset or select the desired threshold at which the AGC amplifier goes into normal AGC operation or is returned to unity gain.

Figure 7:
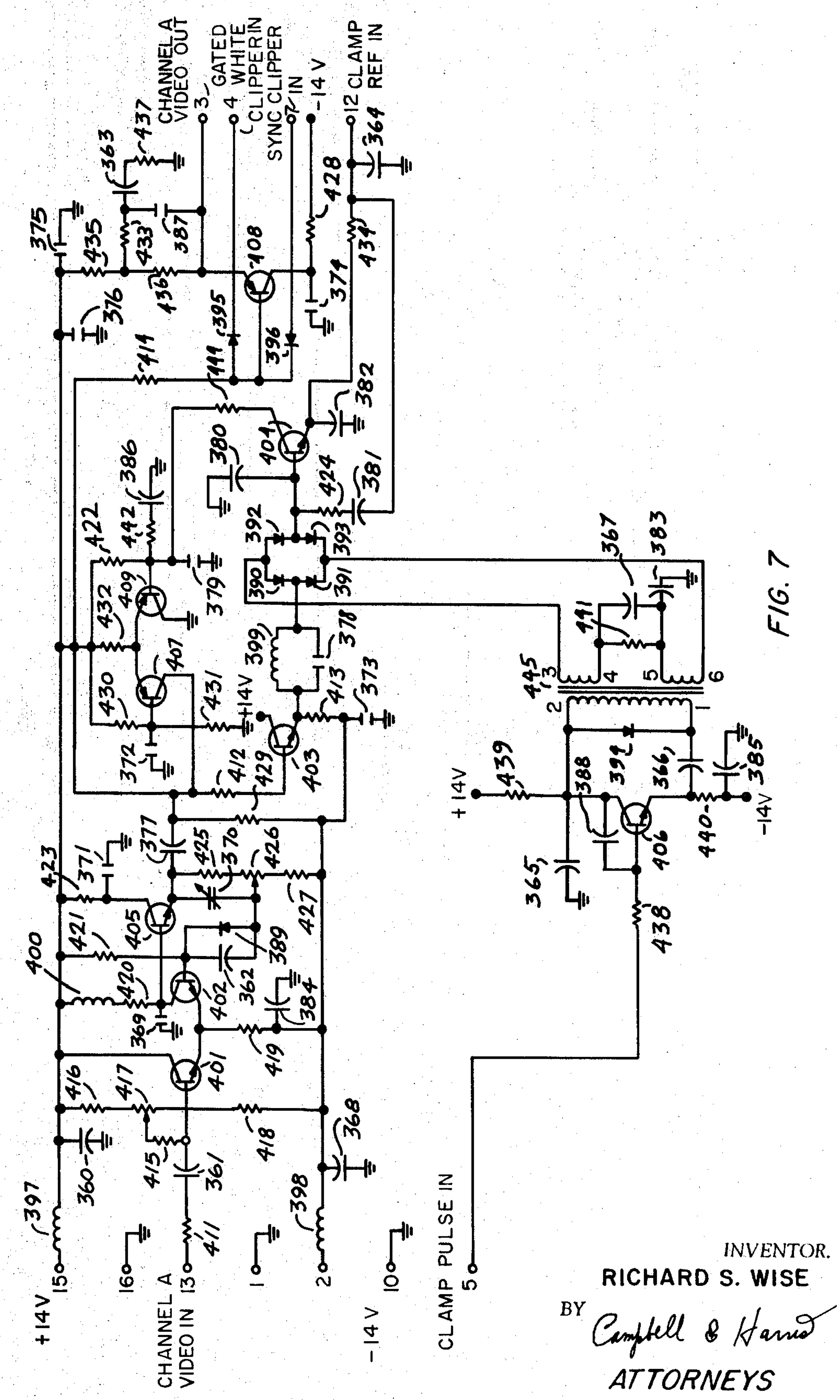

The input video from delay 23 is fed through resistor 411 and capacitor 361 to the base of transistor 401 (FIG. 7). Here, the video is coupled from the emitter of 401 over to the emitter of transistor 402 as in the case of the conventional differential amplifier. The video is amplified by 402. The collector of 402 is coupled over to the base of emitter follower 405 (identified as 67 in FIG. 2 block). Feedback to the base of 402 is obtained by means of zener diode 389 which is tapped back to potentiometer 426. This circuit arrangement then permits transistors 401, 402 and 405 to act as an amplifier having a high input impedance and low output impedance and a voltage gain of approximately 2. The precise gain is adjustable by varying potentiometer 426. Potentiometer 417 in the base circuit of 401 is used to center the differential amplifier at the midpoint of its dynamic range.

The video at the emitter of 405 is then coupled through capacitor 377 over to the base of emitter follower 408 (identified as 69 in FIG. 2 block). Note that the video has not been inverted in the first amplifier. The emitter of 408 then provides a source of low impedance output video.

The DC restoration circuit is actually a DC feedback system. This circuit is made up of transistors 403, diode gate circuit 390, 391, 392 and 393, and transistors 404, 409 and 407. Transistor 406 is used to pulse the gate circuit.

Circuit operation of the DC feedback system is as follows: The video appearing at the right side of capacitor 377 (identified as 68 in FIG. 2 block) is fed down through resistor 412 to the base of emitter follower 403. The video appearing at the emitter of 403 is then coupled over to the diode gate circuit which is comprised of diodes 390, 391, 392 and 393. The color burst, if present, is trapped out by means of the parallel resonant circuit comprised of inductor 399 and capacitor 378 tuned to 3.58 Mc.

Immediately after the sync pulse, a positive-going pulse is applied to pin 5. This clamp pulse is applied to the base of transistor 406 which is used to drive the primary of transformer 445. The polarity of the transformer secondary windings are such that a positive pulse appears at tap number 3 and a negative-going pulse appears at tap number 6 on the pulse transformer. The simultaneous application of these two pulses causes a high current to flow through diodes 390 and 391 on one side of the diode gate and through diodes 392 and 393 on the other side of the diode gate. Since there is a high current flowing through all diodes, there is now a conduction path from the parallel resonant trap inductor 399 and capacitor 378 over to the base of transistor 404. This path exists only during the duration of the clamp pulse or (in other words) only during the duration of the back porch of the video line. At all other times, it is a high impedance or open circuit. By means of this gate circuit, the DC level of the video back porch is then stored on capacitors 381 and 380 and is also applied to the base of transistor 404.

A DC reference is supplied to pin 12. This reference is coupled through resistor 434 and supplied to the emitter of transistor 404, which then acts as a DC amplifier. The collector of 404 is connected to the base of transistor 409 and resistor 422. Capacitor 386 is used to filter out any high frequency component or pulses in the collector circuit of transistor 404. The signal is next coupled from the emitter of transistor 409 and over to the emitter of transistor 407. Transistor 407 is used as a DC current generator since it has a very high collector impedance. The current from the collector of 407 then flows down to the right side of capacitor 377. Resistor 429 is used as a discharge circuit for capacitor 377 such that the right side of capacitor 377 discharges in the negative-going direction.

Assuming a certain error signal fed into the feedback system (assume the video back porch level on the right side of capacitor 377 has shifted upward), this signal is then coupled to the base of transistor 403; from the emitter of 403, it is sampled by the diode gate circuit, and a charge is stored on capacitor 381 and 380 which gives a positive-going DC change. This positive-going DC signal then causes greater conduction of transistor 404 which draws additional current through resistor 422 and additional base current from transistor 409. The polarity of this error signal at the base of transistor 409 hence appears as a negative-going voltage. Since 409 is a PNP type of transistor, the emitter also shifts in the negative-going direction. Since this signal is coupled directly over to the emitter of transistor 407 which is acting as a common base DC amplifier, it is biased toward cutoff or less collector current. The current flowing through resistor 429 down to the −14 v. bus then discharges the right side of capacitor 377 so that it shifts in the negative direction to bring the DC level of the back porch back into proper alignment. Due to the integrator networks in the base of transistor 404, the correction of the servo system occurs over an entire line rather than in one short pulse. The presence or absence of a color burst on the back porch should not influence the feedback system in any way since inductor 399 and capacitor 378 act as a parallel trap at the color burst frequency.

Due to the DC bias voltages on transistors 403, 404 and 408, the DC level of the video back porch as seen at pin 3 on the output terminal is approximately +2 v. with respect to the DC clamp reference at pin 12. The clamp pulse appearing at pin 5 is approximately of 3 μsec. duration and occurs immediately after the trailing edge of the sync pulse. During the vertical blanking interval, this pulse occurs immediately after each equalizing pulse or serration in the vertical sync pulse so that it occurs at a twice per line frequency. Also, during this vertical blanking interval, the width of this clamp pulse is shortened up to approximately 2 μsec. duration.

Diode 395 of channel A is utilized to clip the video white peaks during the active video line, but it passes VITS signals without any clipping. This is accomplished by applying a DC voltage to pin 4. During the vertical blanking period, this DC voltage is pulsed in the positive direction to prevent clipping of the VITS signals. If stretched sync, an optional circuit, is to be added and if this stretched sync is to be clipped, then diode 396 is utilized. The DC voltage at pin 7 is adjusted to provide optimum sync amplitude.

Video channel B is similar to channel A, except diode 396 is not used and the polarity of diode 395 is reversed in such a way that it can be used to clip negative peaks during the blanking interval. A waveform resembling inverted blanking is applied to pin 4. Consequently, blanking, burst and sync are clipped, but the chroma information below the blanking level is not.

It is to be noted that these clipper circuits in the video channels A and B do not create video distortion at the video output since blanking, burst and sync are selected from channel A while the active video signal is selected from channel B.

Figure 9:
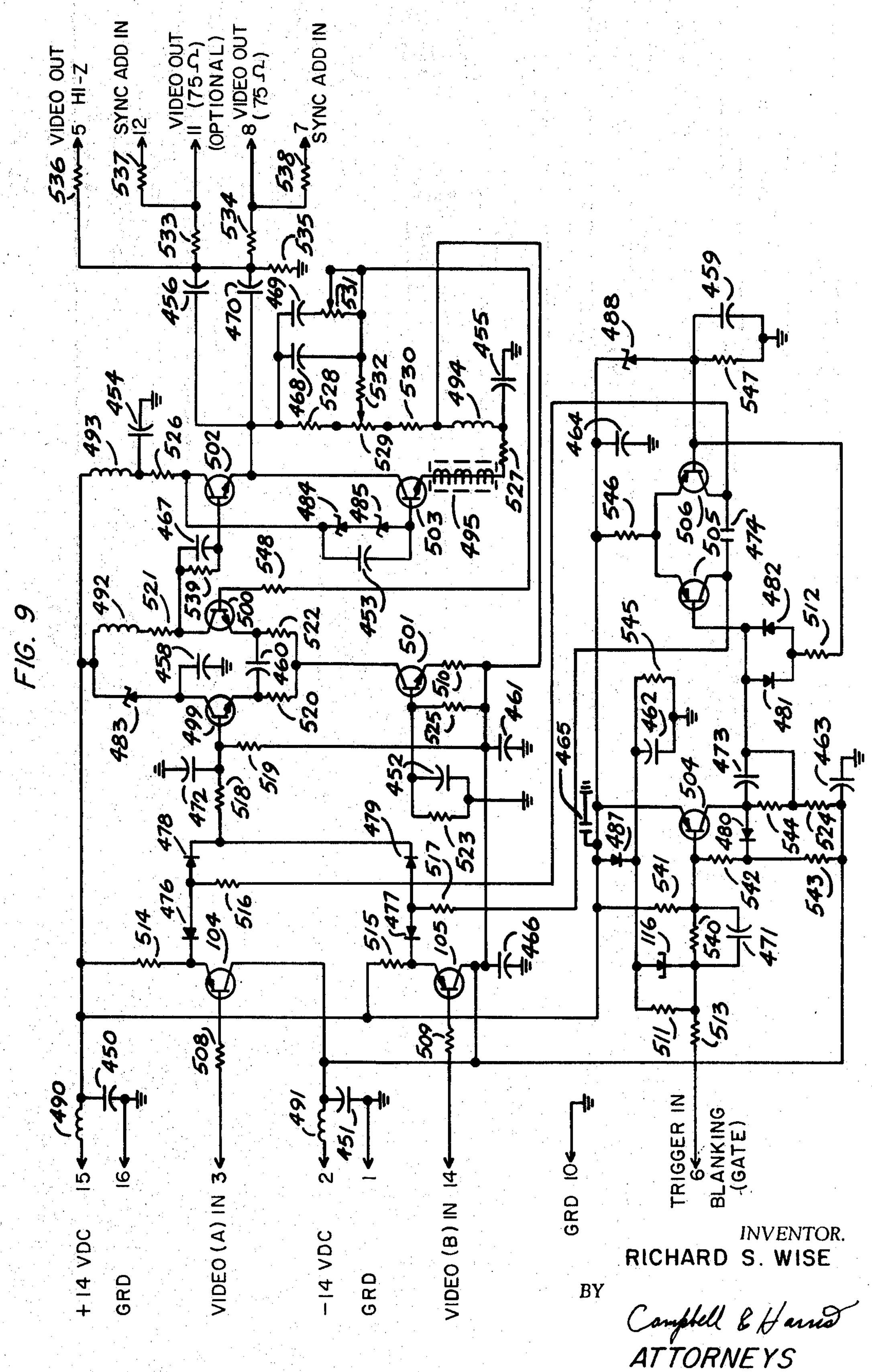

The video from channel A is coupled to follower 104 through pin 3 as shown in FIG. 9. This video is DC coupled in such a way that the black level or "back porch" is at approximately –4 v. DC level. Likewise, the video from channel B is coupled to follower 105 through pin 14 as shown in FIG. 9. When the gate is closed for video channel A, a video signal will progress from pin 3 through emitter follower 104, diodes 476, 478, resistor 518 to the base of transistor 499. This gate is closed by applying a positive voltage to resistor 516 from the collector of transistor 506. This gate will permit a DC current flow from transistor 104 through diode 476 up through resistor 516 to the collector of transistor 506 on one side of the gate, and, on the other side of the gate, a DC current will flow through resistors 519 and 518 and diode 478 up through resistor 516 to the collector of transistor 506. Since diodes 476 and 478 are both conducting, there is a low impedance path from transistor 104 to the base of transistor 499 so that video will readily pass from 104 to the base of 499. The video from channel B, which is applied to pin 14 and transistor 105, is open circuited by means of diode gate 477 and 479. Since the collector current of transistor 505 is cut off, there is no current through diodes 477 and 479; therefore, they present a high impedance or open circuit to the video in the B channel. When the proper signal is applied to the gate channel, the gates applied through resistors 516 and 517 are reversed in polarity so that diodes 476 and 478 are nonconducting, which causes video A to be open circuited. Since diodes 477 and 479 are now conducting, video from channel B will be applied to the base of transistor 499.

The video from the base of transistor 499 is then converted to a low impedance at the emitter of 499 and coupled over to the emitter of transistor 500 by means of a network made up of resistors 520 and 522 and capacitor 460. The amplified video which appears at the collector of transistor 500 will then be coupled over to the base of transistor 502 through resistor 539 and capacitor 467. The output video will then appear at the emitter of transistor 502. An inverted video signal will appear at the collector of 502 which will then be coupled down to the base of transistor 503 so that the transistors 503 and 504 act in a push-pull manner to create an amplifier with a very low output impedance. A DC feedback signal is applied to the base of transistor 499 through resistors 532 and 528, and potentiometer 529.

An AC feedback path is supplied by capacitors 468 and 469 and resistor 531 from the video output terminals. Potentiometer 531 is used to adjust for minimum 60 cycle tilt. The overall video gain from the base of transistor 499 to the emitter of transistor 502 is very close to unity gain; however, it is converted from a high impedance to a very low impedance in the order of a fraction of an ohm. The video signal appears with the same polarity at the output as it does at the base of 499. Two video output signals are provided by this amplifier. One video output signal appears at pin 11 and the second video output appears at pin 8. A series of 75 ohm resistor in each of these output channels provides a 75 ohm sending-end impedance. Provisions to add sync on either one or both channels is available. To add sync to the video appearing at pin 11, the sync signals should be applied to pin 12 from a high impedance source. Likewise, to apply sync to the video output signal appearing at pin 8, a sync signal from a high impedance source should be applied to pin 7.

The trigger blanking to control the switching of the video gates is applied at pin 6 (FIG. 9). When a negative-going step is applied at pin 6, tunnel diode 116 comes into conduction and gives a very sharp negative step. This negative step is applied to 504 which is a PNP-type of transistor. A negative step at the base of 504 will cause a large positive step to appear at the collector of 504. This positive step is coupled through resistor 544 and capacitor 473 into the base of transistor 505. Transistor 505 is then biased into cutoff so that the collector falls in a negative direction and the current through diodes 477 and 479 decays to zero. The video in channel B will then be back-biased or open circuited. In addition, the positive step applied to the base of transistor 505 will be coupled through the emitter over to the emitter of transistor 506. Since 506 is acting as a grounded base amplifier, a positive step on the emitter will bring transistor 506 into conduction so that collector current will flow through to the base of transistor 499. Conversely, when a positive step is applied to pin 6, the polarity of all transistors is reversed, i.e., a positive step is generated by tunnel diode 116 which, in turn, is applied to the base of transistor 504. As 504 is cut off, the collector will fall in a negative direction which will, in turn, apply a negative step to transistor 505. Thus, a current will flow through 505 collector, resistor 517, and diodes 477 and 479, which will close the gate for video channel B. Video channel A will be open-circuited when the collector current of transistor 506 is shut off.

Potentiometer 529 in the emitter circuit of transistor 502 is used to supply a DC current feedback path so that the DC operating level will be properly centered in the dynamic range of the operating capabilities of transistors 502 and 503.

Transistor 501 in the emitter circuit of transistors 499 and 500 is used to provide a large dynamic range or AC swing for transistors 499 and 500. Normally, in a differential amplifier of this type, a common emitter resistor is used; however, improved performance is obtained by replacing this common emitter resistor by a current generator circuit such as is provided by transistor 501. This current generator will maintain the combined emitter current of transistors 104 and 105 at a constant value as the signal swings over a wide dynamic range.

Figure 10:
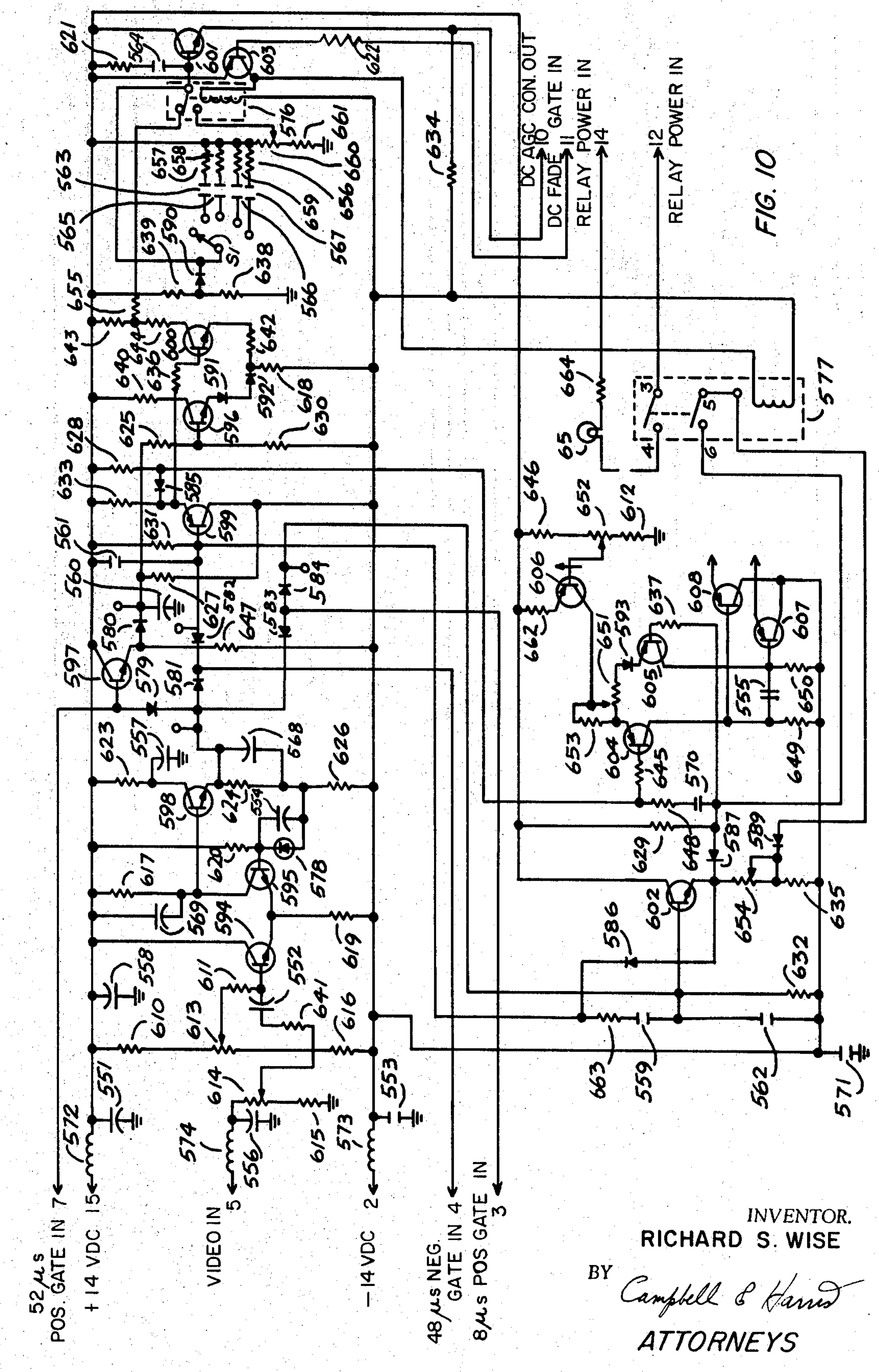

The video output signal of the AGC amplifier is applied to pin 5 for AGC feedback (FIG. 10). Inductor 574 and capacitor 556 are used as a low pass video filter. The nominal bandwidth of this filter is 1 Mc. At 3.58 Mc., the attenuation is approximately 25 db. After the video is passed through the low pass filter, potentiometer 614 is used as a video attenuator. This potentiometer is adjusted from the front panel of the circuit card and determines the video output level. The signal is next applied to the base of transistor 594. Here it is coupled from the base to the emitter of 594 and then over to the emitter of transistor 595. The video signal is amplified in the collector of 595 and applied to the base of transistor 598. Resistors 624 and 626 in the emitter of 598 are used as a voltage divider such that approximately one-third of the video signal is then applied back to the base of transistor 595 through zener diode 578 and capacitor 554. This circuit completes the feedback loop of the noninverting video amplifier made up of transistors 594, 595, and 598. The overall characteristics of this amplifier are a low output impedance and a voltage gain of approximately three. This output signal is applied to each of three gated detector circuits.

The first of these gated detector circuits is made up of diodes 579 and 580, and transistor 597. This circuit is used to sense or establish a DC level which is equal to the video white peaks. The 52 μsec. positive gate pulse is applied at pin 7 and is used to energize the gated detector circuit. This gate pulse supplies a DC current which forwards biased diode 579 so that a video signal is applied to emitter follower 597. The video signal is next applied to the anode of diode 580 such that filter capacitor 560 is charged to the most positive DC level corresponding to the video white peak.

Resistor 627 is used to discharge capacitor 560. It should be noted that the 52 μsec. positive gate applied to pin 7 corresponds with the active video line and is terminated during the line blanking interval. It should be noted that since this gate corresponds only to the active video line, any VITS signals are gated out so that they have no influence upon the detected DC voltage.

The second gated detector circuit is made up of diodes 581 and 582. The gate to energize this detector is supplied to pin 4. This negative gate begins approximately 2 μsec. after the active picture video and terminates approximately 2 μsec. prior to the end of the active picture video. When this gate pulse is applied, diode 581 is forward biased such that the video signal is passed from the emitter of transistor 598 through diode 581. Diode 582 and capacitor 561 are used to sense the most negative video peaks of the active picture video. Capacitor 561 is slowly discharged by means of resistor 607.

The third-gated detector circuit is made up of diodes 583 and 584. This gated detector is energized by means of an 8 μsec. positive gate pulse applied to pin 3. This positive gate pulse occurs during the line blanking period. It begins approximately 2 μsec. after the beginning of line blanking and ends approximately 1 μsec. prior to the end of line blanking. This 8 μsec. gate pulse then forwards bias diode 583 so that the video signal is applied to the peak detector 584 and capacitor 562. Capacitor 562 is charged up to the DC level corresponding to the blanking DC level, or (in a case of a composite video signal) capacitor 562 is charged up to the DC level corresponding to the video back porch DC level. Resistor 632 is used to discharge filter capacitor 562.

The setup or pedestal on any particular video signal is determined by the use of the differential amplifier made up of transistors 604 and 605. This differential amplifier operates from the DC voltages supplied from the peak black and blanking detectors. These DC voltages are converted to a low impedance circuit by the means of emitter followers 599 and 602, respectively. The voltage applied to emitter follower 599 is then coupled through diode 585. Diode 585 is forward biased by means of resistor 628, so that the DC voltage can then be applied from transistor 599 through diode 585 and resistor 645 to the base of transistor 604. The voltage applied to emitter follower 602 is applied through diode 587 and resistor 637 to the base of transistor 605. Resistor 629 is used to forward bias diode 587 in such a way that the diode passes the DC voltage from transistor 602 to the base of transistor 605. The DC voltages applied to the bases an transistors 599 and 602 are filtered by means of an RC network made up of resistor 663 and capacitor 559. This DC voltage is again filtered in the base circuit of transistors 604 and 605 by means of an RC network made up of resistor 648 and capacitor 570. Since transistors 604 and 605 are used as a differential amplifier, the DC voltages applied to the base may move up or down with little effect upon the collector currents of these two transistors. However, the differential amplifier operates on any differences voltage between these two bases. Transistor 606 in the emitter circuit of the differential amplifiers 604 and 605 is used as a DC current generator to replace the common emitter resistor normally used in differential amplifier circuits. This permits the differential amplifier to operate over wide DC levels with little or no change in the collector current of transistors 604 and 605. Potentiometer 652 in the base circuit of transistor 606 is used to establish the proper DC collector currents for transistors 604 and 605.

Diodes 585 and 587 in the emitter circuit of transistors 599 and 602, respectively, are used to eliminate any transients or rapid DC shifts due to change of video scenes or switching in a new video picture. To properly understand the operation of this circuit assume, first a positive voltage step due to change of video scene at the base of 599. This step is then applied to the cathode of diode 585. Since the filter network resistor 648 and capacitor 570 is connected between the anode of diodes 587 and 585, diode 585 becomes open circuit. Consequently, the positive step is not transmitted through diode 585. In the case of a negative voltage step due to change of video scene, this negative step is coupled through transistor 599 and diode 585 and applied through resistor 645 to the base of transistor 604. This negative voltage step is also coupled through filter network resistor 648 and capacitor 570 and applied to the base of transistor 605. Furthermore, this negative step is applied to the anode of diode 587 so that this diode becomes open circuit. Since this same negative step is applied simultaneously to both transistors 604, and 605, there is no change in collector current in either transistor.

Using the same line of reasoning, it is seen that a positive or negative step can be applied to emitter follower 602. In the case of a positive step at 602, diode 587 becomes open circuit so that the step is blocked. In the case of a negative step at transistor 602, the step will be passed through diode 587 and applied to transistor 605. This negative voltage step is also applied through capacitor 570 and resistor 648 to the base of transistor 604. Diode 585 becomes open circuit; hence the same positive step is applied to both inputs of the differential amplifier thus minimizing the change of collector currents.

Potentiometer 651 in the emitter circuit of transistors 604 and 605 is used to adjust the output video signal for optimum setup. The two outputs of the differential amplifiers 604 and 605 are applied respectively to the emitter followers 608 and 607. These two DC voltages are then applied to pins 8 and 9. At this point, the DC voltages are applied to channel B and channel A, respectively.

Two DC voltages are supplied to the input of differential amplifier 596–600; the DC level corresponds to the video white peak and the video black peak DC level. The DC voltage (video white) is supplied directly through resistor 625 to the base of transistor 596. The DC voltage (video black) is applied through emitter follower 599 and resistor 636 to transistor 600. The differential amplifier 596–600 then senses the difference between these two DC levels and applied an error signal from the collector circuit of 600 through series resistor 655 and relay contacts of relay 576 to the base of emitter follower 601. The DC voltage at the emitter of 601 is then coupled out to pin 10 where it controls the attenuator network 48. This DC error or control voltage is filtered by means of a filter network made up of resistors 655 and 621 and capacitor 564. This network limits the response time of the AGC amplifier to approximately 0.1 sec. When a longer time constant is desired on the AGC control network, the wafer switch S1 can be advanced to positions 2, 3, 4 and 5. Each of these positions selects a filter network with a greater time constant; consequently, an optimum time constant between the range of 0.1 to approximately 1.5 sec. can be selected.

A fade-to-black detector supplies a DC voltage to pin 11. When the video fades below a certain preset level, a DC voltage is applied to pin 11 and through resistor 622 to transistor 603. Transistor 603 then energizes relays 576 and 577. When relay 576 is energized, the control voltage for the video attenuator 48 is transferred from differential amplifier 596–600 to potentiometer 660. This potentiometer is preset to such a level that the DC voltage supplied to the base of transistor 601 and to the video gain attenuator 48 to set the gain of the AGC amplifier to approximately unity gain. When the video signals return to normal level, the voltage applied to transistor 603 is interrupted such that relay 576 is deenergized and the AGC amplifier resumes normal operation.

Relay 577 is also energized by transistor 603 during a video fade-to-black level. When this occurs, contacts 3 and 4 of relay 577 supply a DC potential to fade light 65. Contacts 5 and 6 of the relay 577 are closed during this interval. When these contacts are closed, the DC voltage applied to the base of transistor 605 is transferred to a more negative potential which is obtained from diode 589. This permits diode 587 to become open circuit. By applying a more negative voltage to the base of 605 of the differential amplifier, it is possible to reduce the video setup or to eliminate any setup during the video fade-to-black level. Potentiometer 654 in the emitter circuit of transistor 602 allows the operator to adjust the setup between approximately zero and 10 percent during the video fade-to-black level. When normal video amplitude returns, relay 577 becomes deenergized such that the AGC amplifier resumes normal operation.

Transistor 742 (FIG. 11) is used as a grounded base sine wave oscillator. In this sine wave oscillator, the base is held at AC ground by means of capacitor 682. The RF tank circuit in the collector consists of capacitors 686 and 687 in series and the inductance consists of inductors 738 and 739 in series. Voltage feedback from collector to emitter is provided by means of a voltage tap (between capacitors 686 and 687) to the emitter of transitor 742. To adjust the frequency of the 31.5 kc. oscillator, the sine wave signal is coupled out through capacitor 685 to the diode attenuator consisting of diodes 710 and 711. The value of capacitor 685 is such that the sine wave is shifted approximately 90°. This signal then is coupled through capacitor 684 to the base of transistor 741 which is used as a reactance modulator circuit. The collector current of 741 then is 90° out of phase with the collector current of 742. By varying the amplitude of the signal applied to the base of transistor 741, the amplitude of the reactive current generated in the collector of 741 is varied so that the frequency of the sine wave oscillator can be varied upward or downward by approximately ±10 percent of the nominal value. The actual DC current going through the diode attenuators 710 and 711 provides a means of varying the signal amplitude at the base of transistor 741. When there is no DC current through the diode attenuator, the signal amplitude is maximum; when there is a relatively large DC current going through diodes 710 and 711, the signal is shunted to ground so that a very small signal is applied to the base of 741.

The voltage output of 31.5 kc. oscillator next is coupled through resistor 767 and capacitor 688 to micrologic 670. Micrologic circuit 670 is used as a two-stage, overdriven amplifier. A signal is first applied to pin 1 which is the base of transistor therein. The signal is amplified and applied to the collector of a second transistor at pin 7. Then it is coupled out and applied to pin 5, the base of a third transistor. Here again the signal is amplified and coupled out from pin 6.

The waveform from micrologic circuit 670 appears as a 31.5 kc. square wave since it was amplified and clipped twice in micrologic 670. This voltage is applied to pin 2 of micrologic 672 which is used as a divide-by-two multivibrator. Note that the counter or flip-flop changes state only on negative-going transitions of the input waveform. The output voltage of micrologic 672 appears as a 15.75 kc. square wave which appears at pin 5 (inverted). The square wave signal is differentiated by capacitor 692 and applied to the one-shot multivibrator including transistors 751 and 752. Another output is coupled down to micrologic circuit 671.

The one-shot multivibrator including transistors 751 and 752 is biased by resistors 784 and 785 so that 751 is normally in conduction. When a negative-going pulse is developed across capacitor 692, this negative pulse is applied through diode 713 to the base of 751 so that the transistor is driven into cutoff. This negative pulse is coupled from the emitter of 751 to the emitter of transistor 752, thence up to the collector where it still appears as a negative pulse. This negative pulse is coupled through capacitor 697 and diode 714 back to the base of 751 to sustain regeneration.

This regeneration biases transitor 751 into cutoff and transistor 752 then goes into heavy conduction. This conduction exists for approximately 11 μsec. which permits the charge on capacitor 697 to decay through resistors 785 and 784. At this time, 751 comes into conduction again and regeneration begins which resets the multivibrator in the initial condition. The precise width of the positive-going output pulse is determined by the adjustment of resistor 784 (blanking width). This 11 μsec. positive pulse, which is developed in the collector of 751, is coupled out through capacitor 698 to pin 10. This pulse is identified as the inverted line blanking pulse. Note that the width of the inverted line blanking pulse does not influence the width of the line blanking in the video output signal from the AGC equipment. This waveform is used internally in the equipment only.

An inverted 31.5 kc. square wave is developed at pin 5 of micrologic 672. This square wave is differentiated by capacitor 693 and used to trigger the one-shot multivibrator which includes transistors 747 and 748. This multivibrator is similar to multivibrator discussed above, except that PNP-type transistors are used, which require that all AC voltages also be inverted. In this application, the square wave applied to capacitor 693 is to be differentiated so that a positive and negative-going voltage spike is generated. The positive-going voltage spike is to be coupled through diode 730 to the base of transistor 747. This spike triggers the one-shot multivibrator so that a negative-going pulse is developed in the collector of 747. The width of this pulse is variable between approximately 1.5 and 3.5 μsec. Potentiometer 810 is used to provide this adjustment range. This potentiometer provides phase adjustment of the 15 kc. blanking, in other words, the line blanking signal may be adjusted with respect to the incoming sync signal obtained at pin 4.

Next, the negative-going pulse from the collector of transistor 747 is differentiated by capacitor 705. The trailing edge of the pulse (the positive spike) is coupled through diode 728 and applied to the base of transistor 745. This pulse triggers the one-shot multivibrator including transistors 745 and 746, so that a negative-going 25 μsec. gate is developed at the collector of 745. This gate is then coupled through capacitor 701 to the time discriminator, which is made up of diodes 723, 724, 725 and 726, a transformer, and several other associated components.

The other pulse signal applied to the time discriminator originates from the video signal at pin 4. It is transmitted through transistors 744, 754, 753 and 743, and micrologic 671. The nominal range of the video applied to pin 4 of the circuit card may vary between approximately 3 and 20 v. peak-to-peak. Transistor 744 is used as an emitter follower to convert from a high impedance to a low impedance output.

The video signal from the emitter of transistor 744 then is coupled out through diode 718, capacitor 680 and resistor 811 to the base of transistor 754. Normally, transistor 754 is at cutoff; however, it comes into conduction on the sync tips so that the inverted sync waveform appears at the collector of 754. Diodes 718 and 720 act as a limiting network so that the positive portion of the waveform which contains video is clipped off before a signal is applied to the base of 754. In the event the input signal to pin 4 is only approximately 3 v. peak-to-peak, a full video signal can be seen at the base of 754. If this signal is approximately 20 v. peak-to-peak, most of the video is clipped off so that only sync and blanking remain. This is done to prevent the emitter-base junction of 754 from being damaged by excessive reverse peak voltages. The video signal at the emitter of transitor 744 is also coupled through capacitor 700 down to diodes 717 and 719. These diodes act as a peak-to-peak video detector so that the peak voltage is stored on capacitor 699. This voltage then is applied to the base of transistor 750 through resistor 797.

Transistor 750 is used as a DC current generator to supply base bias current for transistor 754. With low amplitude video signals at pin 4, transistor 750 is near cutoff so that the base bias current for 754 flows only through resistor 799. When the peak-to-peak video amplitude at pin 4 becomes large, a DC potential of several volts or greater is developed across capacitor 699, and applied to the base of 750 This creates an increase of collector current of 750 so that greater base bias current is drawn through resistor 811 and transistor 754. This increase of base bias current gives improved sync clipping action by transitor 754 over a wide dynamic operating range.

An inverted composite sync signal appears at the collector of transistor 754. This signal then is applied to amplifier-inverter 753. Four volts composite sync from the original video signal then is applied to pin 14. A second sync signal is applied to capacitor 703. This capacitor differentiates the inverted sync signal so that the positive-going voltage spike is applied to micrologic 671, pin 1.

In this circuit application, micrologic circuit 671 is used as a one-shot, 2 μsec. multivibrator. In the steady-state condition, circuit 671 is held so that current goes through resistor 789. When a positive-going voltage spike is applied to pin 1 of circuit 671, a negative-going signal is applied to pin 7, coupled through capacitor 704, and applied to pin 5. This causes a positive-going pulse to appear at pin 6 of circuit 671 and is coupled back to pin 2. This holds the multivibrator in this state for approximately 2 μsec. After 2 μsec., the charge on capacitor 704 decays through resistor 789. A negative pulse then is applied from pin 6 back to pin 2 and the multivibrator reverts to its original state. The output voltage waveform is approximately a 2 μsec., 1 v. positive pulse. During the vertical blanking period, the positive voltage spike applied to pin 1 of circuit 671 occurs at twice-line rate because of equalizing pulses and serrations in the vertical sync pulse. To prevent multivibrator 671 from being triggered at twice-line rate, a positive pulse is applied to pin 3 of circuit 671.

The 2 μsec. pulse applied to the base of transistor 743 then brings the transistor into heavy conduction for the interval so that a current pulse is drawn through the primary of the transformer. This pulse generates a pulse in each of its two secondary windings so that a pulse current flows through diodes 723 and 724 and through resistor 773. A second path is through diodes 725 and 726. Hence, during the interval of this 2 μsec. pulse, the junction between diodes 723 and 724 is at approximately the same potential as the junction between diodes 725 and 726. At all other times, these diodes are reversed biased by several volts due to the charge on capacitor 675. This 2 μsec. pulse across the diode bridge is the second input to the time discriminator circuit. The first input is a 25 μsec. negative gate which is generated by multivibrator including transistors 745 and 746.

If the incoming pulse is advanced 2 or 3 μsec. in time, the diode bridge gate circuit is energized early so that the waveform of the multivibrators 745 and 746 is sampled while it is still in a positive state. This provides a positive pulse to be applied to capacitor 678 and resistor 757 in the bask circuit of transistor 749. This DC error signal shortens the period of the sine wave oscillator 742 to bring the two waveforms into the correct relationship. In the event the 2 μsec. pulse is delayed several microseconds, this causes a negative pulse to be gated through the diode bridge and applied to capacitor 678 and resistor 757 in the base circuit of transitor 749. This negative voltage then biases 749 further towards cutoff so that less current flows through the diode attenuator 710 and 711. The oscillator then shifts frequency so that its period is lengthened to achieve the proper relationship.

Figure 12:
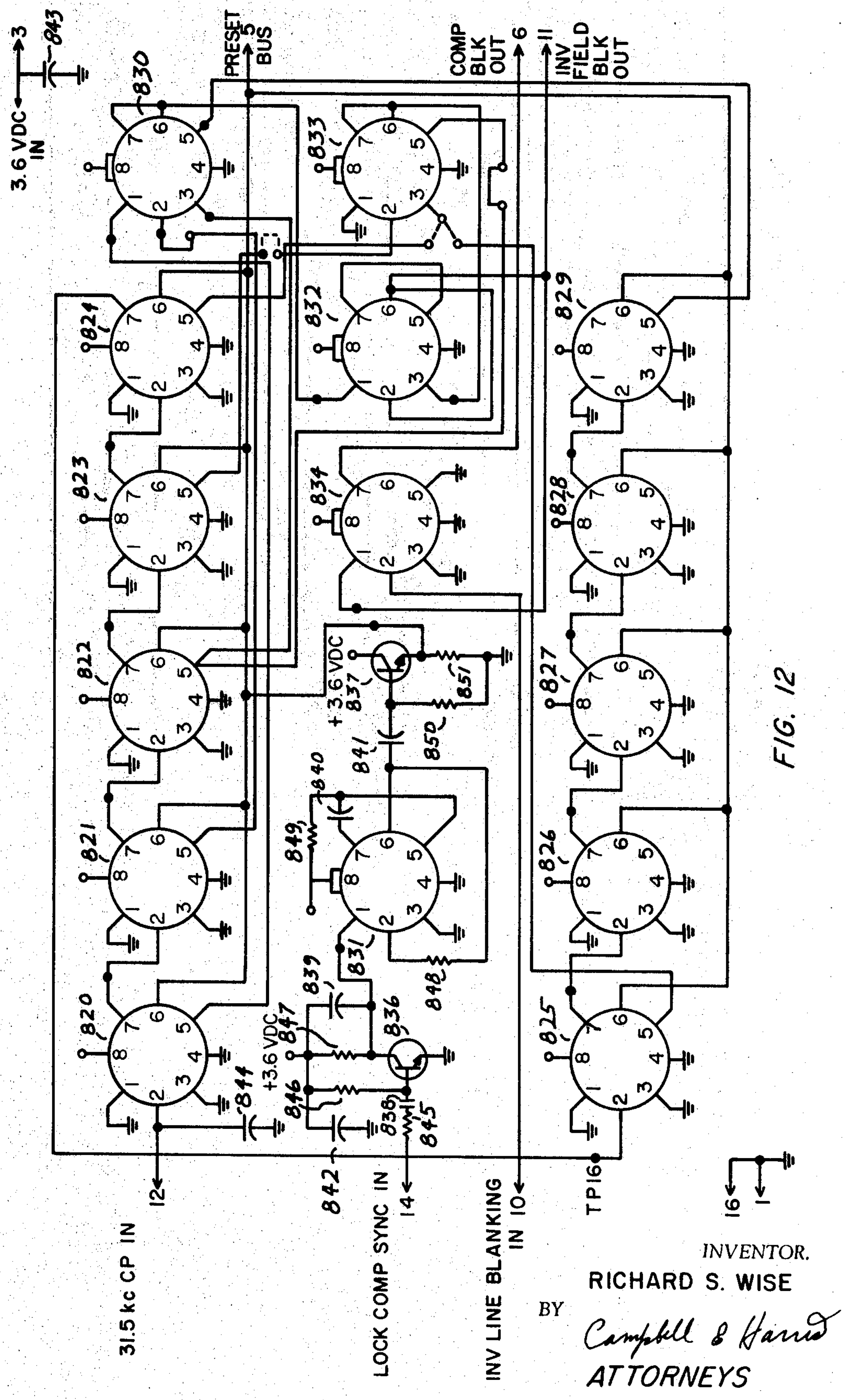

The 31.5 kc. clock pulse is applied to pin 12 of FIG. 12. It should be noted that this 31.5 kc. clock pulse is actually a 31.5 kc. square wave. The negative-going transition of this square wave is the reference point for the clock pulse since the flip-flops change state only on a negative-going transition. The positive-going transition of the square wave has no effect. This square wave, which is approximately 1 v. peak-to-peak amplitude, is applied to pin 2 of micrologic circuit 820. The output waveform appears at pin 7 of circuit 820 and is coupled over to pin 2 of micrologic 821. Since circuit 821 changes state only on a negative-going transition or the square wave, it operates on one-half frequency or approximately 15.75 kc. Again, the output of circuit 821 is taken from pin 7 and applied to pin 2 in such a way that its output waveform at pin 7 is approximately 7.5 kc. Similarly, each micrologic circuit divides by two. Micrologic circuit 823 also divides by two, and its output is applied to circuit 824; the countdown procedure then continues in this fashion to micrologic 825, 826, 827, 828, and 829. Note that the square wave is always applied to pin 2 which is the input of the micrologic circuit, and the output is always taken at pin 7 of micrologic circuits 820 and 829 inclusive. Also, the other collector circuit of the micrologic is available at pin 5 so that the inverted waveform, or the opposite state of the flip-flop always appears at pin 5 of micrologic circuits 820 through 829.

Figure 16:
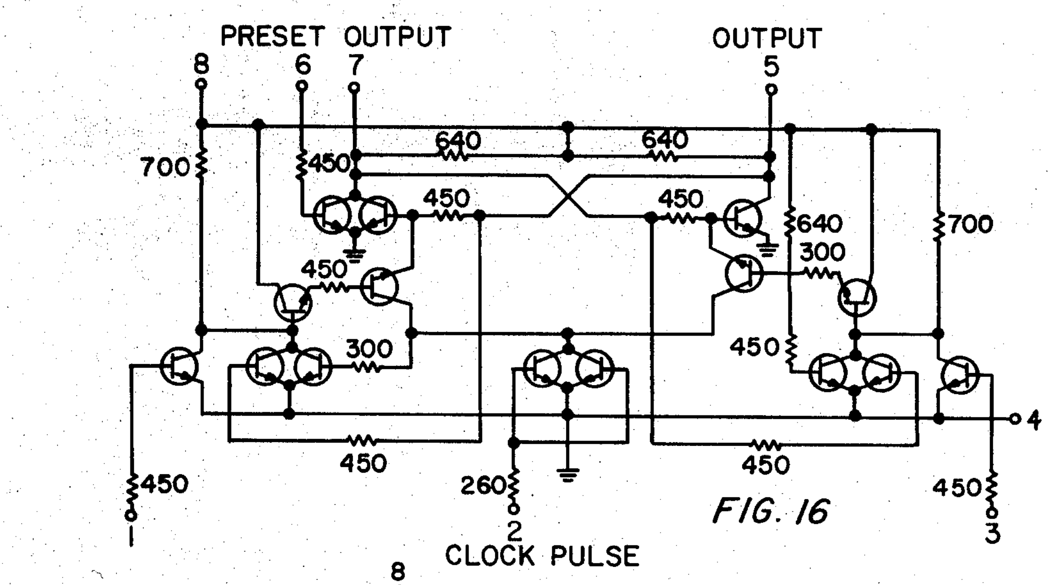

FIG. 16 illustrates a typical micrologic circuit that can be used to divide by two. The circuit shown is a bistable multivibrator. It can also be preset before the count begins so that the multivibrator is in the desired state prior to the first clock pulse counted.

The flip-flop operates between the ground and a supply voltage of +3.6 v. DC. The two output gates, which are opposite polarity, appear at pins 5 and 7. As in any multivibrator, each of these gates has two states. One of these states is low or a digital zero where the DC output potential is about 0.2 v. DC. The other state is high or a digital one where the DC output potential is about 1 v. DC or more depending on the external load on that particular collector. When there is no external load, the gate in the high state rises to approximately +1.2 v. DC.

When the flip-flop is used as a divide by two counter, the square wave or clock pulse to be counted is applied to pin 2. The flip-flop changes state or toggles on the negative-going transition of the square wave, but it is not affected by the positive-going transition. Thus, two negative-going transitions are required to generate one square wave cycle.

When a positive-going preset pulse of greater than 1 v. amplitude and 50 nsec. duration is applied to pin 6, the flip-flop resets to the following state: Pin 7 low (zero) and pin 5 high (one), regardless of whether it has been this state or the opposite state. The duration of this preset pulse must be short enough to permit the flip-flop to toggle on the next negative-going transition of the input square wave, clock pulse at pin 2.

The 31.5 kc. square wave (clock pulse) applied as input to pin 12 (FIG. 12) is synchronized to the line blanking input. To provide vertical synchronization, composite sync is applied to pin 14. This composite sync signal is approximately 4 v. peak-to-peak. The signal is applied through resistor 845 to the base of transistor 836 which acts as an inverter integrator circuit. The actual integrator circuit is made up of resistor 847 and capacitor 839 in the collector of 836. When the long vertical sync pulse arrives, transistor 836 is held in cutoff for a relatively long period; the integrator circuit then changes in a positive-going direction. This waveform is applied to pin 1 of micrologic 831. Circuit 831 is connected externally to act as a one-shot multivibrator. When the integrated voltage at the collector of 836 rises above approximately 1 v. DC level, the one-shot multivibrator 831 is triggered. The positive-going gate is then generated at the output of circuit 831 (pin 6). Capacitor 841 then differentiates this square wave. The leading edge (positive) of this square pulse is applied to the base of transistor 837 which is used as an emitter follower. It should be noted that this differentiated positive-going pulse is identified as the preset pulse and is used to preset micrologic circuits 820 through 829 to the same state. This preset pulse occurs approximately 15 μsec. after the leading edge of the vertical sync pulse.

The first clock pulse arriving immediately after the preset pulse is designated clock pulse No. 1. The micrologic circuits 820 and 829 then begin their binary countdown and continue counting until the next preset pulse arrives which corresponds to the next vertical sync pulse. Micrologic 833, which is used as a dual two-imput gate circuit with two collectors tied together, determines when the field blanking period should end. The three input gates are applied to pins 2, 3 and 5. This gate circuit generates a positive-going waveform at the output only when all the input gates to go digital zero (low). The solid lines representing the jumpers are used to generate a 21 line blanking interval, while dotted lines represent optional bus wire jumper positions generating other line blanking intervals. When no gate signal is applied to one of the input pins of circuit 833, this signal should be considered as digital zero (low state). Using the solid lines to indicate a position of the optional jumpers, micrologic 833 generates a positive-going output gate at clock pulse 36.

This output waveform of micrologic 833 develops at pin 6 and is applied to micrologic 832 pin 3. This gate sets the bistable multivibrator 833 in such a way that pin 6 goes to digital zero or low. It also should be noted that after clock pulse 36, additional positive pulses or gates are applied to pin 3 of circuit 832. However, since circuit 832 has already been triggered into its present state by the first pulse, these subsequent pulses have no effect; i.e., they do not cause a change of state. Circuit 832 remains in this state until a positive pulse is applied to pin 1 to trigger it back to the original state. This pulse does not arrive until clock pulse No. 519 is generated.

Micrologic circuit 830 is used as a dual two-input gate to begin the blanking period which corresponds with designated clock pulse 519. An output waveform from circuit 830 is generated only when the signals applied to the input gate circuits, pins 1, 2, 3 and 5, all go to digital zero or low state. It should also be noted that micrologic 829 is the last circuit in the ten-stage binary countdown to change state. This happens at clock pulse 512. At clock pulse 519, micrologic circuits 820, 822, and 823 are also in such a state that the output gates supplied to 830 circuit are all simultaneously at digital zero. Circuit 830 generates a positive-going waveform at the output. The two collectors (pins 6 and 7) have been connected to create a four-input gate circuit.

The positive-going output waveform of circuit 830 is then coupled over to pin 1 of circuit 832. This pulse resets bistable multivibrator 832 in the other state so that the output of the multivibrator (pin 6) goes to the high state (digital one). Thus, circuit 832 generates a single square pulse whose duration is equal to 21 lines. The polarity of this square wave is a positive-going gate which is inverted with respect to the normal blanking signal. This signal is applied to pin 11 and also to pin 1 of circuit 834.

The other input for circuit 834 is obtained from input pin 10. This signal is inverted line blanking. Circuit 834 adds these two digital signals together to generate a composite blanking signal which appears at circuit 834, pin 7 and is coupled out to pin 8.

Figure 17:
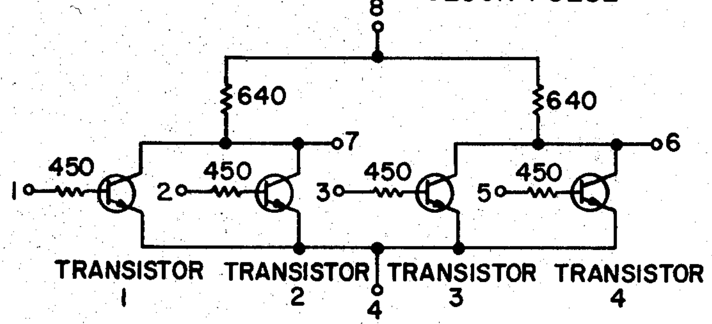

FIG. 17 illustrates the second form of micrologic unit used. The second type of integrated circuit used is a dual two-input gate logic circuit. Like the flip-flop of FIG. 16, this circuit operates also from a +3.6 v. DC supply. The DC signal levels are similar too. A positive 1 v. DC input to a base is sufficient to cause saturation of that particular transistor in such a way that the collector voltage falls to approximately 0.2 v. DC or less. When no signal is applied to the base (low or digital zero) the collector will rise to +1 v. DC or greater (high or digital 1) depending on the external load.

Observe that transistors 1 and 2 share a common collector load resistor, as do transistors 3 and 4. Since transistors 1 and 2 share a common load resistor, a one (high) applied to either pin 1 or 2 causes the collector, pin 7, to be zero (low). Also note that pin 7 is high (one), only if pins 1 and 2 are both low (zero). The same reasoning may also be applied to transistors 3 and 4.

In many applications, both collector loads are tied together (pins 6 and 7). With this circuit, a one at any base causes the collector to go low (zero). Conversely, the collector goes high (one) only when a (zero) is applied simultaneously to all four of the bases (pins 1, 2, 3 and 5). This circuit would then be called a four-input gate logic circuit. If there is no connection to a base or if the base is grounded, this is considered a zero since the transistor will be biased at collector cutoff.

The option of generating a blanking signal corresponding with either 17, 21 or 24 lines is used to provide alternate methods of accommodating the vertical interval test signals which may be present in the input video waveform. Since this composite blanking signal generated is used only internally for switching and gating circuits, it does not affect the vertical blanking width of the AGC amplifier output video signal.

Figure 13:
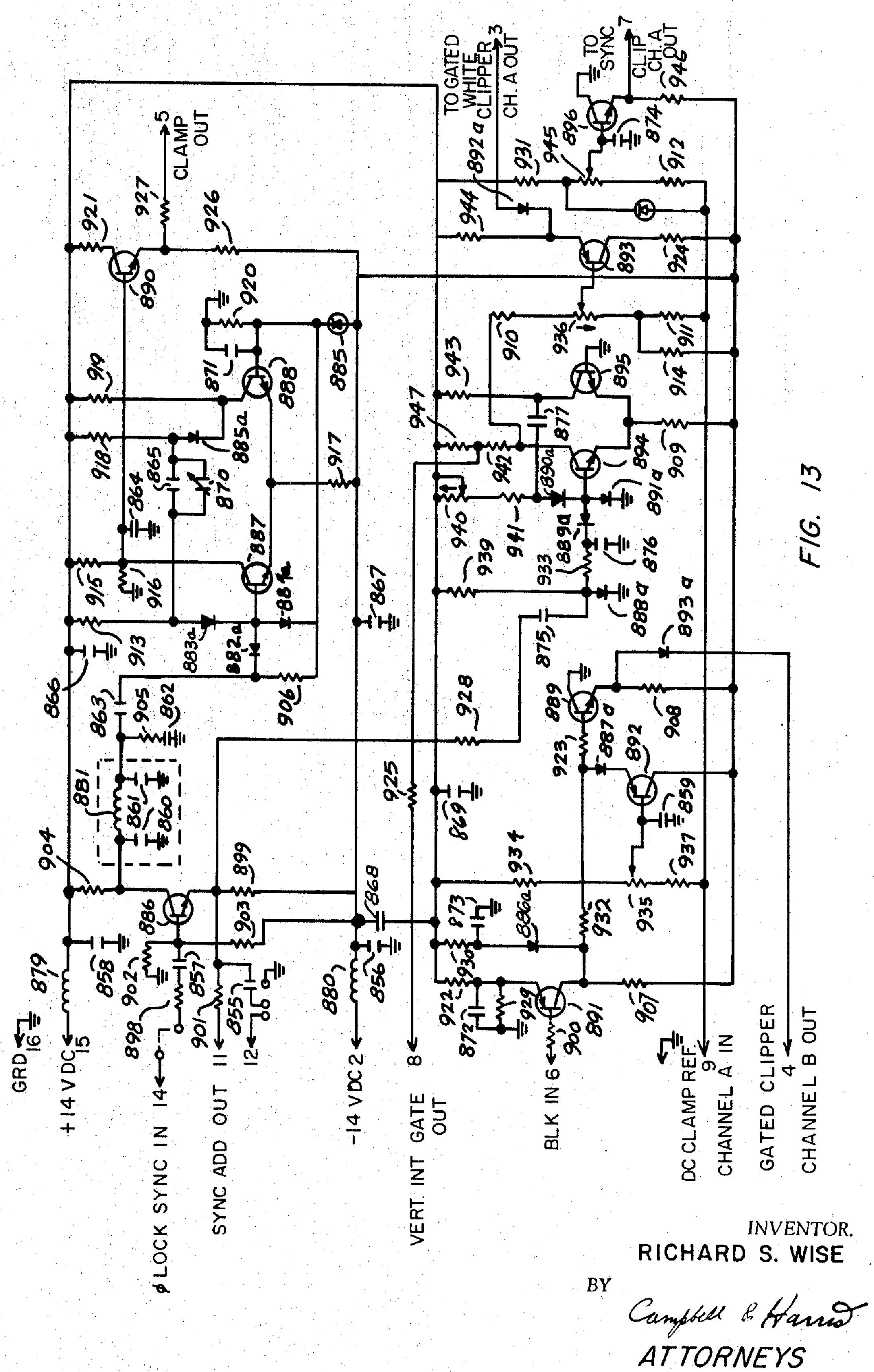

The detailed circuit operation of the clamp clipper is illustrated in FIG. 13. The composite sync signal is applied to pins 13 or 14. An optional jumper is applied between the appropriate posts so that sync is applied to transistor 886 which acts as an inverter amplifier. The inverted sync signal appears at the collector of 886 and is then applied to a 0.05 $\mu$sec. delay network consisting of inductor 881, and capacitors 860 and 861. This signal is differentiated by capacitor 863 and applied through diode 882*a* to transistor 887. Transistors 887 and 888 are used as a one-shot multivibrator. After the negative pulse occurring at the trailing edge of sync is applied to the base of transistor 887, the signal is coupled over to the emitter of transistor 888. This signal is next coupled from the emitter of 888 up to the collector; it is coupled back through diodes 885*a*—883*a* and capacitors 865—870 to the base of transitor 887; this initiates regeneration. Transistors 887 is then biased to cutoff, which permits transistor 888 to conduct. After approximately 3 $\mu$sec., the charge on capacitors 865 and 870 discharges through resistor 913 such that the multivibrator will then recover. It should be noted that the recovery or recharge of capacitors 965 and 970 is through resistor 918. Normally, the current flowing through resistor 918 is sufficient for completely recharging capacitors 965 and 970. However, during the vertical interval, the multivibrator triggers twice per line on the equalizing pulses and the vertical serrations of the sync pulse. During this interval, capacitors 965 and 970 are not completely recharged through resistor 918. The net effect of this operation is that the width of the generated pulse is shortened from 3 $\mu$sec. to approximately 2 $\mu$sec. The output from the one-shot multivibrator is taken from the collector of transistor 887 and applied to emitter follower 890. The output is then coupled through resistor 927 into pin 5. This signal is identified as the clamp pulse used in the keyed clamp circuits.

The composite blanking signal is applied to pin 6 and the base of transistor 891. Transistor 891 amplifies and inverts this blanking signal and applies the signal to the base of transistor 889. It should also be noted that the network made up of resistor 930, capacitor 873, and diode 886*a* increases the width of the inverted line blanking signal by approximately 1 $\mu$sec. A DC reference voltage is applied to pin 9. This DC voltage is then applied through resistors 937, 935 and 934 to the base of transistor 892 which acts as an emitter follower. Transitor 892 acts as a clipper or limiter by means of diode 887*a*; thus, the inverted blanking signal applied to the base of 889 is clipped at a specific DC level with reference to the DC potential at pin 9. The inverted blanking signal is coupled out through emitter follower 889 to pin 4; here, it is applied to channel B. This signal functions in channel B to clip the undershoots or other distortions of the video signals. It also clips sync and color burst if these signals are present. However, it should be noted that the blanking, sync, and color burst appearing in the output video signal are actually obtained from the A video input card. Therefore, clipping the B channel during blanking period minimizes any undershoots which may occur due to switching between the A and B channels. It should also be noticed that this inverted blanking signal terminates approximately 1 $\mu$sec. after the input blanking signal; consequently, there is no distortion or loss of any chroma information of the B video on channel B.

The composite sync signal obtained at the emitter of transistor 886 is also applied through resistor 928 and capacitor 875 to the integrator network made up of resistor 933, and capacitor 876. Diode 888*a* is used as a DC restoration circuit. This integrator network develops a negative pulse out during the vertical sync period. This negative signal is then used to trigger a one-shot multivibrator 894–895. Circuit operation on this multivibrator is quite similar to multivibrator 887–888, except that the period is approximately the same width as vertical blanking. Potentiometer 940 is used as an adjustment so that the period of the multivibrator terminates at the same instant the vertical blanking signal is terminated.

The positive-going gate at the collector of transistor 894 is next coupled through resistors 910 and 936 to the base of emitter follower 893. This emitter follower is used to supply a DC potential which is used in clipping video white peaks from the channel A video. It should be observed that the precise DC level of this output signal is referenced to the DC input voltage appearing at pin 9. When the one-shot multivibrator 894–895 is triggered, the output of transistor 887 rises by approximately 1 to 2 v.; thus, any vertical interval test signals which are present at the channel A video are not clipped, but are permitted to pass through undistorted. It should also be observed that the DC output signal from transistor 893 is used to clip video peaks in the A channel only. This does not create any distortion in the output video signal since the channel B video is used to supply only the active video waveforms to the output circuit. The actual video waveform of channel A video input is of concern only during the line blanking interval and during the vertical interval which may contain VITS signals.

A second output signal from one-shot multivibrator 894–895 is also utilized. This waveform is coupled out through resistor 925 to pin 8. This waveform is identified as the vertical interval gate.

Provision is made to add or stretch sync and then clip off the excess sync amplitude. This optical feature is recommended when handling relatively poor quality video or a remote video signal which may require that the sync signal be reconstructed. In order to utilize this optional feature, it is necessary to connect a bus wire jumper so that composite sync can be applied to pin 12. This then permits the sync appearing in the A channel to be stretched or lengthened by adding approximately 0.2 v. sync below the normal sync tips. After the video waveform with the lengthened sync is passed partially through the channel A, it is clipped. The DC potential necessary to establish the desired clipping level is generated by transistor 896. Note that this DC clipping level is referenced to the DC clamp reference for channel A which appears at pin 9. This DC signal is then applied through series resistor 912 and potentiometer 945; it is coupled out through the emitter follower pin 7. The net effect of this sync stretch circuit and associated clipping circuit is to reference the sync amplitude with respect to the backporch of the video signal.

In cases where the video sync signal is relatively clean, there is no reason to stretch and reclip the sync signal. If this is the situation, the bus wire jumper should be deleted, and potentiometer 945 on the clamp clipper card should be adjusted extremely clockwise so that no clipping action results.

It should be noted that the DC potential (approximately –5 to –6 v.) is applied to pin 9. This DC voltage is referenced to the DC level of the video backporch on the video output signal. Hence, all video or sync clipping circuits are referenced to this same backporch DC level.

One additional output signal at pin 13 has not yet been mentioned. This output signal is composite sync and is identical to the composite sync signal applied to the base of transistor 886.

The gate pulse generator (FIG. 14) has the composite blanking signal applied to transistor 989. Local blanking may be applied by means of an optional jumper shown in FIG. 14. The input blanking signal is coupled from the emitter of 989 over to the emitter of transistor 989. This circuit actually slices the blanking signal so that the signal output at the collector of 989 is independent of amplitude changes of the input blanking signal. The signal that appears at pin 6 is similar to the input signal. The inverted blanking signal is coupled from the collector of 988 to pin 10. It is also applied to transistors 993, 994 and 995.

The inverted blanking signal which is applied to the base of transistor 993 is inverted again in the collector of 993. Capacitor 957 is used to provide a relatively slow fall time so that a delay of approximately 1.5 $\mu$sec. is provided before the pulse is coupled through diode 972, capacitor 965, and diode 973 to the base of transistor 991. When the negative signal is applied to the base of 991, this negative pulse is coupled over to transistor 992 and then to the collector of 992 back through capacitor 958 and diode 974 to initiate regeneration. Transistor 991 is then driven into cutoff and remains at cutoff until the charge on capacitor 958 decays through resistors 1039 and 1027. At this time, it reverts back to its original state. A positive-going gate of approximately 8 $\mu$sec. is generated at the collector of 991 and applied to pin 3.

The inverted blanking signal is also applied to the base of transistor 995. Transistor 995 is held at saturation (the collector will be negative) during the blanking period. At the termination of field blanking, 995 is driven into cutoff, and the collector then swings positive. Capacitor 964 is used to retard the rise time of the collector in such a way that the DC potential at the anode of diode 979 becomes positive after approximately 2 $\mu$sec. Diode 979 then comes into conduction, and a positive pulse is generated across resistor 1018. This positive pulse is coupled through capacitor 966 and diode 981 to the base of transistor 997 which with transistor 998 is used as a one-shot multivibrator. Its operation is similar to one-shot multivibrator 991–992, except that PNP-type transistors are utilized. Consequently, all polarities and waveforms are inverted. The one-shot multivibrator is then triggered by the positive pulse at the base of 997. The period is determined by capacitor 959 and resistors 1040 and 1043. Resistor 1040 is adjusted so that a negative-going 48 $\mu$sec. gate is generated at the collector of 997 and coupled out to pin 4. The integration network resistor 1042 and capacitor 967 in the collector circuit of transistor 995 is to be noted. This network is used to prevent the one-shot multivibrator 997–998 from being triggered till at least one time after field blanking ends. This prevents the last one-half line of the vertical blanking from causing any erroneous triggering of the multivibrator. Note the collector of transistor 995, resistors 1024 and 1038, and diodes 977 and 980; this circuit is utilized to reset the one-shot multivibrator at termination of the last one-half line prior to field blanking to again prevent erroneous triggering of transistors 997 and 998.

The inverted blanking signal is also applied through resistor 1003 to transistor 994. The output waveform at the collector of 994 is then coupled out to pin 7. This waveform is utilized by the gated detector card to sense the DC level of the white video peaks. When the optional jumper is completed, this output waveform occurs during line blanking, but is interrupted during field blanking. This circuit arrangement permits the gated detector to sense only the video white peaks occurring during the active video picture. The VITS signals occurring during field blanking period are not sensed. When the optional jumper is deleted, a DC potential is generated by 994; i.e., 994 is in conduction or saturation in such a way that the output waveform at pin 7 actually is a positive DC gate voltage. This allows the gated detector card to sense the video peaks occurring during the VITS signals as well as during the active picture video.

The positive vertical interval gate obtained from the clamp clipper is also applied to pin 11. It is then applied through an optional jumper to the base of transistor 996. This positive gate begins with the vertical sync pulse and concludes after line 21 or line 22. The purpose of 996 is to inhibit or prevent the one-shot multivibrator 997–998 from being triggered during this interval. When it is desired that the AGC amplifier sense only video peak blacks during the active video line, the optional bus wire jumper should be completed. If, on the other hand, it is desired that the gated detector card sense the video peak blacks during the active picture video as well as during the VITS signals, then the optional jumper should be deleted. The actual circuit operation of transistor 996 is such that when a positive gate is applied to its base, it comes into heavy conductance or saturation and remains in this state until the gate applied to its base is terminated. Since 996 is in parallel with transistor 995, the action of 995 has no effect during this interval. 995 resumes normal operation only after termination of the positive gate applied to the base of 996. In other words, 996 inhibits the one-shot multivibrator 997–998 and prevents its being triggered during the interval of the vertical interval gate obtained from pin 11.

Figure 15:
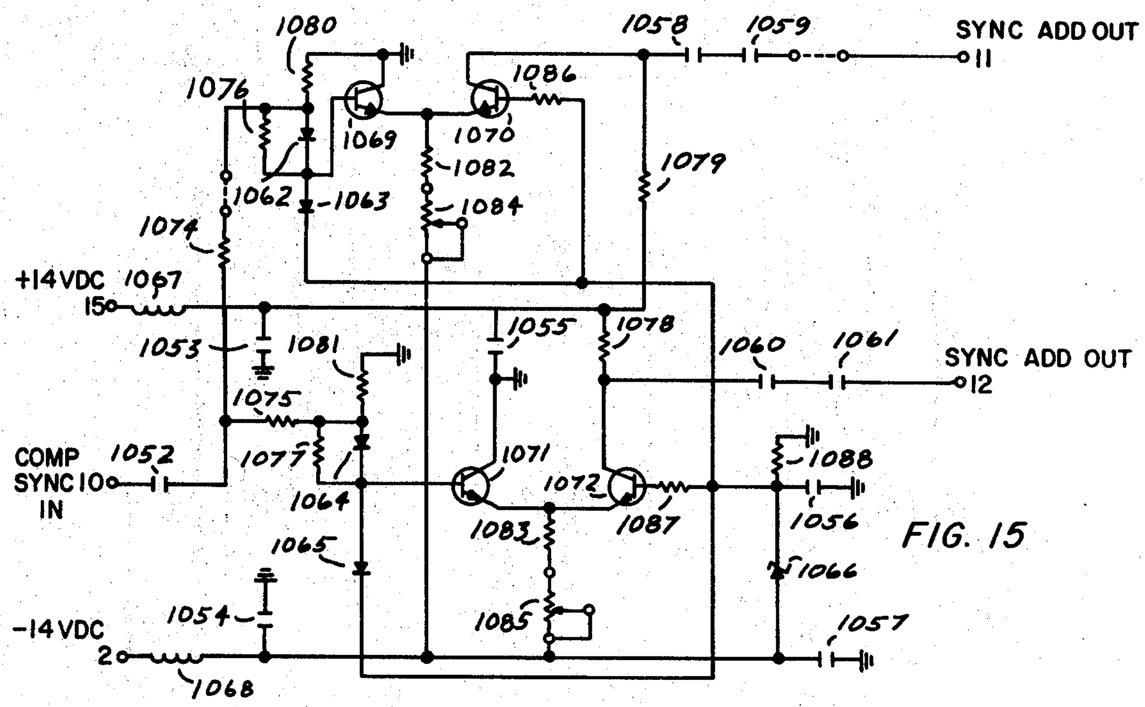

The sync add is shown in FIG. 15. Composite sync is applied at pin 10. It is next coupled in through capacitor 1052 and applied to the base of transistor 1071 through resistors 1075 and 1077 and diode 1064. Transistors 1071 and 1072 act as a slicer type circuit so that the sync is sliced at about threefourths v. below the baseline. Transistor 1072 is a grounded base type of amplifier which is normally at cutoff. When a negative sync pulse is applied to transistor 1071, the emitter of 1071 swings negative so that 1072 then comes into conduction. The negative sync pulse on the emitter of 1071 causes a negative sync pulse at the collector 1072. This sync pulse is AC coupled out through capacitors 1060 and 1061 and matrixed onto the output of the equipment that is being used. Since resistor 1078 in the collector of 1072 is approximately 22,000 ohms, the sync add will have a relatively high output impedance. The amplitude of the sync added onto the output terminals is determined by the current which flows through resistors 1083 and 1085 in the emitter circuit 1071 and 1072. Potentiometer 1085 provides an adjustment of the sync amplitude so that the amplitude of the sync added can be varied approximately from 0.25 v. to 0.5 v. The second sync add channel, composed of transistors 1069 and 1070, is identical to the first channel except for the two optional jumpers. When sync is added to both channels, these two optional jumpers should be placed in the circuit.

Figure 6:
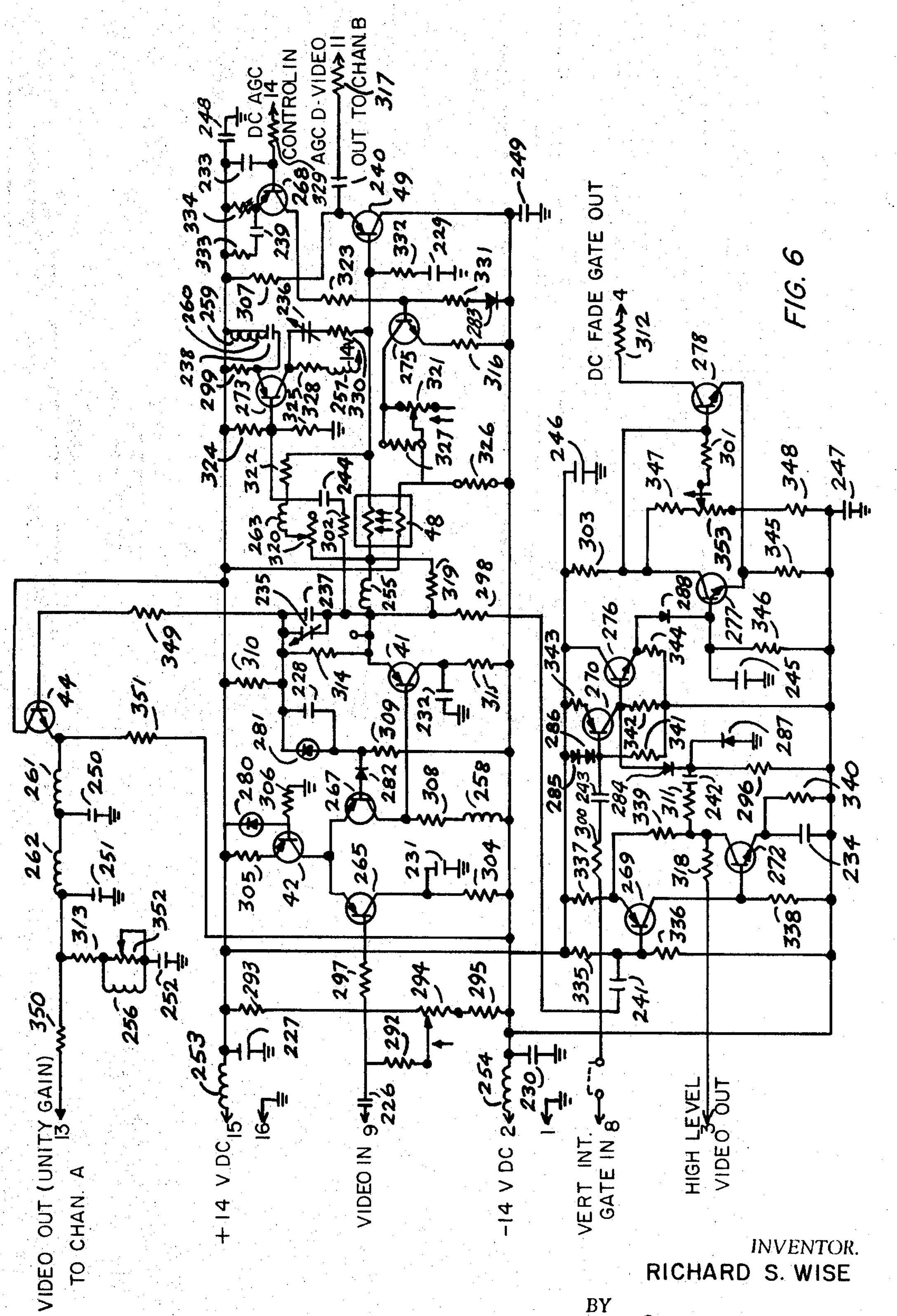

COMPONENTS OF FIGURE 6—Capacitors: 226, 227, 228, 229, 230–15 μf; 231–0.001 μf; 232, 233, 234–0.002 μf; 235, 236–2.5 to 11 pf; 237–10 pf; 238–47 pf; 239–33 μf; 240–3.3 μf; 241, 242–6.8 μf; 243, 244–2.2 μf; 245–1.0 μf; 246, 247, 248, 249–0.1 μf; 250–24 pf; 251–5 pf; 252–39 μf. Inductors: 253, 254–1 μh; 255–12 μh; 256–10 μh; 257–4.7 μh; 258–18 μh; 259, 260–Ferrite Bead; 261–2.2 μh; 262–6.8 μh; 263–15 μh. Transistors and Diodes: 265, 42, 267, 268, 269, 270–2N3251; 41–2N3133; 272–A9335; 273, 49–2N3 324; 275–SM4781–2; 276, 277, 278, 44–2N3565; 280–1N 747A; 281–1N751A; 282, MV833; 283–1N270; 284, 285, 286, 287, 288–A9201. Raysistor: 48–CK1104P. Resistors: 292–68 K; 293–12 K; 294–5 K; 295, 296–15 K; 297, 298, 299, 300, 301, 302, 303–1 K; 304–1.5 K; 305–270; 306, 307–2.2 K; 308–2.4 K; 309–3.3 K; 310, 311, 312, 313–220; 314–430; 315, 316, 317, 318–100; 319–6.8 K; 320, 321–5 K; 322, 323–3.9 K; 324–33 K; 325–22 K; 326–selectable; 327–selectable; 328, 329–470; 330–4.7 K; 331–2 K; 332–1.2 K; 333–22; 334(Varistor)–023L9; 335– 4.3 K; 336–33 K; 337–120; 338–1.2 K; 339–390; 340–27; 342–100 K; 343–360; 344, 345–10 K; 346–1 M; 347–18 K; 348–47 K; 349, 350–390; 351–2.7 K; 352–500; 353–25 K.

Figure 8:
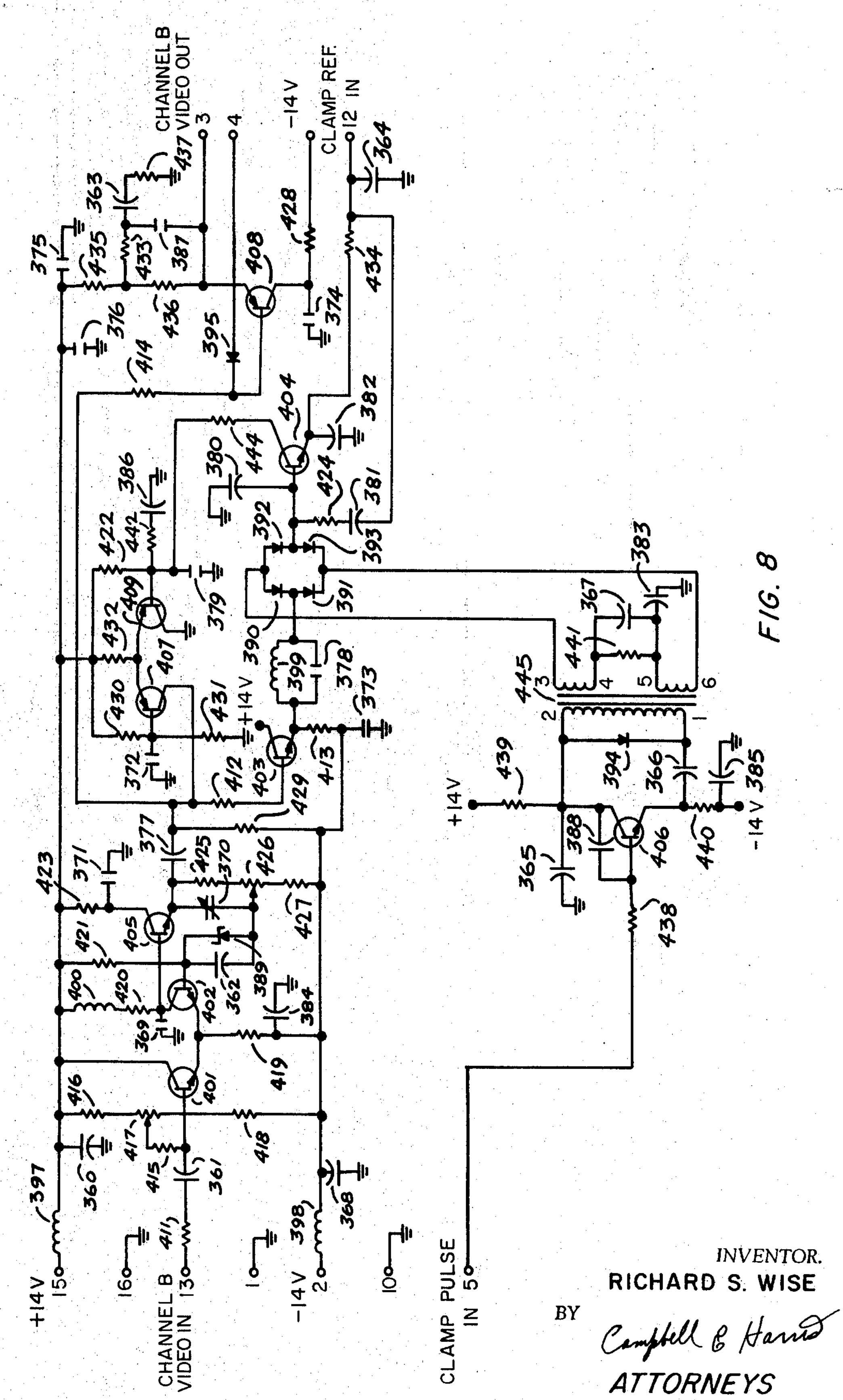

COMPONENTS OF FIGURES 7 AND 8—Capacitors: 360, 361, 362, 363, 364, 365, 366, 367–15 μf; 368–100 μf; 369–10 pf; 370–2.5 to 11 pf; 371, 372, 373, 374, 375, 376–0.002 μf; 377–3.3 μf; 378–2,000 pf; 379–0.02 μf; 380–0.47 μf; 381–68 μf; 382–0.15 μf; 383–0.1 μf; 384, 385–0.01 μf; 386–22 μf; 387–22 pf; 388–47 pf. Diodes: 389–1N751A; 390, 391, 392, 393, 394, 395, 396–A9201. Inductors: 397, 398, 399–1 μh; 400–18 μh. Transitors: 401, 402, 403, 404–A9312; 405, 406–A9335; 407, 408–2N3251; 409–2N3638A. Resistors: 411, 412, 413, 414–1 K; 415–47 K; 416–15 K; 417–5 K; 418–12 K; 419–910; 420–2.4 K; 421, 422–10 K; 423, 424–100; 425–390 (FIG. 7) 330 ohm (FIG. 8); 426–100; 427, 428–220; 429, 430, 431–2.7 K; 432, 433–470; 434–220; 435, 436–750; 437–100 K; 438–1.2 K; 439–1 50; 440–1.2 K; 441, 442–3.9 K; 444–6.8 K; 445–transformer, pulse - 90-676.

COMPONENTS OF FIGURE 9—Capacitors: 450, 451, 452, 453, 454, 455, 456–15 μf; 458, 459–0.001 μf; 460–15 pf; 461, 462, 463, 464, 465, 466–0.002 μf; 467–33 pf; 468, 469–4.7 μf; 470–1000 μf; 471–47 pf; 472–5 pf; 473–47 pf; 474–5 pf. Diodes: 476, 477, 478, 479, 480, 481, 482–A9201; 483, 484 485–1N758A; 116–1N3717; 487–1N270; 488–1N 754A. Inductors: 490, 491 μh; 492, 493, 494–Inductor, molded, 4.7 μh; 495–Ferrite beads. Transistors: 104, 105–2N 3638A; 499, 500–2N3227; 501–A9312; 502, 503–A9335; 504–2N3251; 505–2N3324; 506–2N3251. Resistors: 508, 509, 510, 511, 512, 513–100; 514, 515–1.8 K; 516–2.2 K; 517–1.8 K; 518–47; 519–10 K; 520–22; 521–1.2 K; 522–33; 523, 524–5.1 K; 525–1.1 K; 526, 527–100; 528–1.2 K; 529–1 K; 530–4.7 K; 531–2.5 K; 532–3.3 K; 533, 534–75; 535, 536–1 K; 537, 538, 539–330; 540–470; 541–1.5 K; 542–10 K; 543–27 K; 544–560; 545–10 K; 546–1.5 K; 547–680; 548–68.

COMPONENTS OF FIGURE 10—Capacitors: 551, 552, 553, 554, 555–15 μf; 556–220 pf; 557, 558–0.002 μf; 559–47 pf; 560–1.8 μf; 561, 562–0.47 μf; 563, 564–3.3 μf; 565–6.8 : 566–15 : 567–33 μf; 568, 569–47 μf; 570–39 μf; 571–0.01 μf. Inductors: 572, 573–1 μ; 574–100 μh. Relays: 576–701–3; 577–202–3. Diodes: 578–1N751A; 579—587, 589—592–A9201; 593–1N270. Transistors: 594, 595, 596, 597–A9312; 598–A9335; 599–2N3251; 600, 601, 602–2N 3565; 603–2N3133; 604, 605, 606, 607, 608–2N3638A. Resistors: 610, 611, 612–5.6 K; 613–5 K; 614–10 K; 615–27 K; 616–2.7 K; 617, 618–4.7; 619–1 K; 620, 621, 622–3.3 K; 623–22; 624–510; 625–2.7 K; 626–180; 627, 628, 629–1 M; 630–10 M; 631, 632–2.2 M; 633, 634, 635–100 K; 636, 637, 638, 639–10 K; 640, 641–330; 642–10; 643, 644, 645, 646, 647–4.7 K; 648–1 K; 649, 650–2 K; 651–250; 652–2 K; 653–220; 654–5 K; 655–220 K; 656–47; 657–1.5 K; 658–560; 659–270; 660–500; 661, 662–820; 663–68 K; 664–820.

Figure 11:
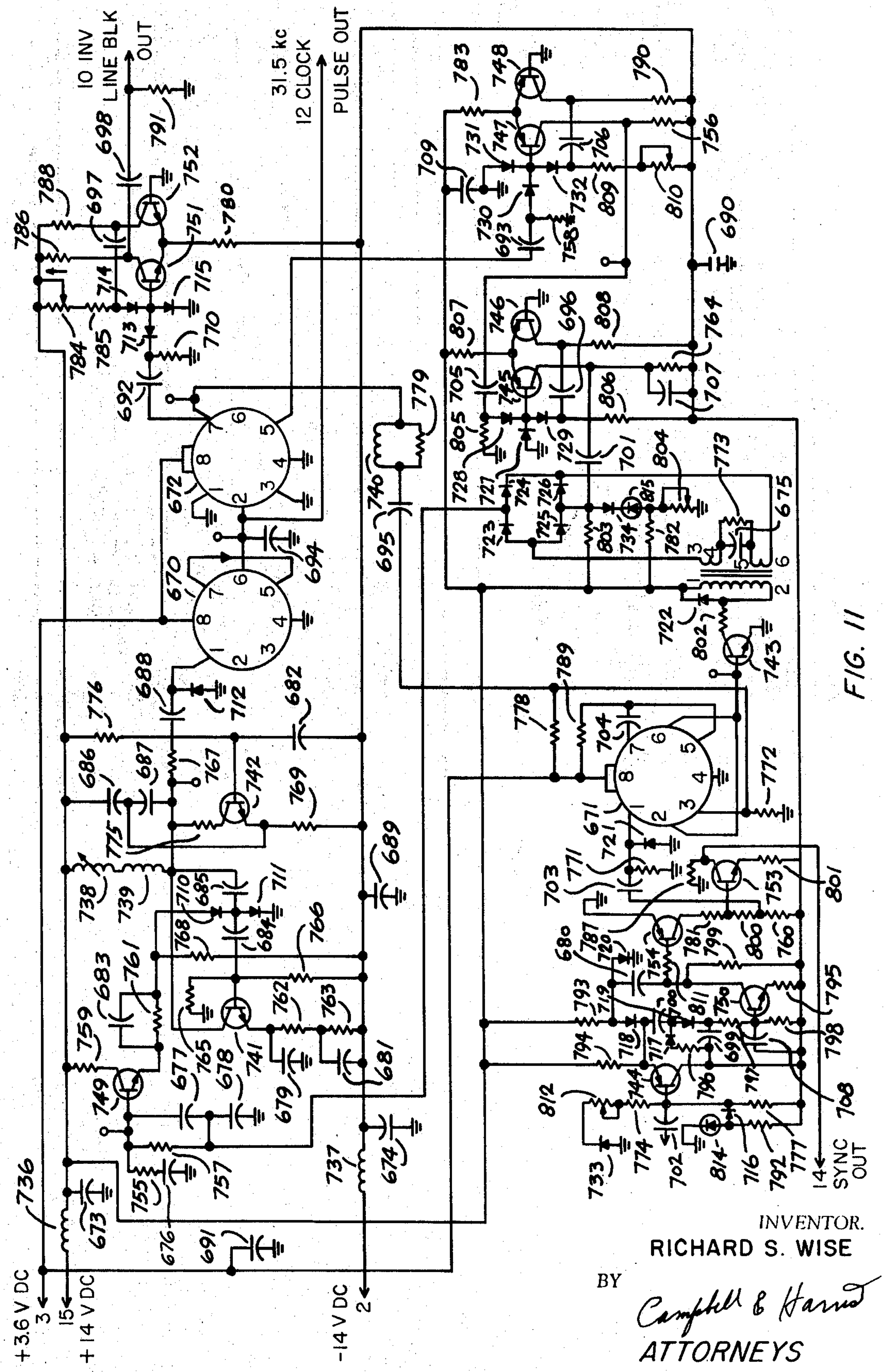

COMPONENTS OF FIG. 11—Micrologic Units: 670, 671–UX 8991428X; 672–UX 8992328X; Capacitors; 673, 674, 675–15 μf; 676–2.2 ; 677–0.02 μf; 678–0.03 μf; 679, 680–0.047 μf; 681, 682–3.3 μf; 683–1.0 μf; 684–0.005 μf; 685–150 pf; 686–0.015 μf; 687–0.0047 μf; 688, 689, 690, 691–0.01 μf; 692, 693, 694–220 pf; 695, 696–1500 pf; 697–560 pf; 698, 699, 700, 701–0.1 μf; 702–0.47 μf; 703–68 pf; 704–330 pf; 705, 706–100 pf. Diodes: 707, 708, 709–0.001 μf; 710, 711, 712, 713, 714, 715, 716 through 726, 727 through 733–A9201; 734–1N270. Inductors: 736, 737–1 μ; 738–1000 μh; 739–5 mh.; 740–10 mh. Transistors: 741, 742, 743–A9335; 744, 745, 746, 747, 748–2N3638A; 749, 750–2N 3565; 751, 752, 753–A9312; 754–2N3251. Resistors: 755, 756–1 K; 757, 758–47 K; 759, 760–470; 761–220; 762–150; 763, 764–680; 765, 766, 767–22 K; 768, 769, 770, 771, 772, 773, 774–10 K; 775–1.5 K; 776, 777, 778–100 K; 785–24 K; 786, 787–1.2 K; 788, 789, 790–6.8 K; 791–2.2 K; 792, 793–4.7 K; 794, 795–15 K; 796–330; 797–470 K; 798–120 K; 799–130 K; 800, 801–820; 802–82; 803–12 K; 804–500 ohms; 805–8.2 K; 806–33 K; 807–1.2 K; 808–1.8 K; 809–18 K; 810–25 K; 811–75; 812–25 K. Diodes: 814–1N752A; 815–nN 747A.

COMPONENTS OF FIGURE 12: Micrologic Circuits: 820 through 829–UX8992328X; 830 through 834–UX8991428X. Transistors: 836, 837–A9312. Capacitors: 838–15 μf; 839–.068 μf; 840–0.1 μf; 841–1,000 pf; 842, 843–.01 μf. Resistors: 844–47 pf; 845–2.2 K; 846–4.7 K;847–1.2 K; 848, 849–10 K; 850–6.8 K; 851–1 K.

COMPONENTS OF FIGURE 13—Capacitors: 855, 856, 857, 858, 859–15 μf; 860, 861–22 pf; 862–0.1 μf; 863, 864, 865–100 pf; 866, 867, 868, 869–0.002 μf; 870–7–45; 871, 872–0.001 μf; 873–180 pf; 874–2.2 μf; 875–3.3 μf; 876–0.0047 μf; 877–0.018 μf. Inductors: 879, 880–1 μh; 881–47 μh. Diodes: 882*a* to 893*a* –A9201; 885–1N754A. Transistors: 886, 887, 888, 889–A9312; 890–A9335; 891–2N 3324; 892, 893–2N3638A; 894, 895, 896–2N3565. Resistors: 898, 899, 900–1 K; 901–330; 902, 903–47 K; 904–1.8 K; 905, 906, 907, 908, 909–10 K; 910, 911, 912–10 K; 913, 914–39 K; 915, 916–1.5 K; 917–560; 918– 330 K; 919–3.3 K; 920–1.2 K; 921, 922, 923, 924, 925–100; 926–2.2 K; 927, 928–150; 929–5.6 K; 930, 931–27 K; 932, 933–4.7 K; 934–91 K; 935, 936–10 K; 937–3.6 K; 938–27; 939–150 K; 940–50 K; 941–68 K; 942–6.2 K; 943, 944–15 K; 945–5 K; 946, 947–1.8 K.

Figure 14:
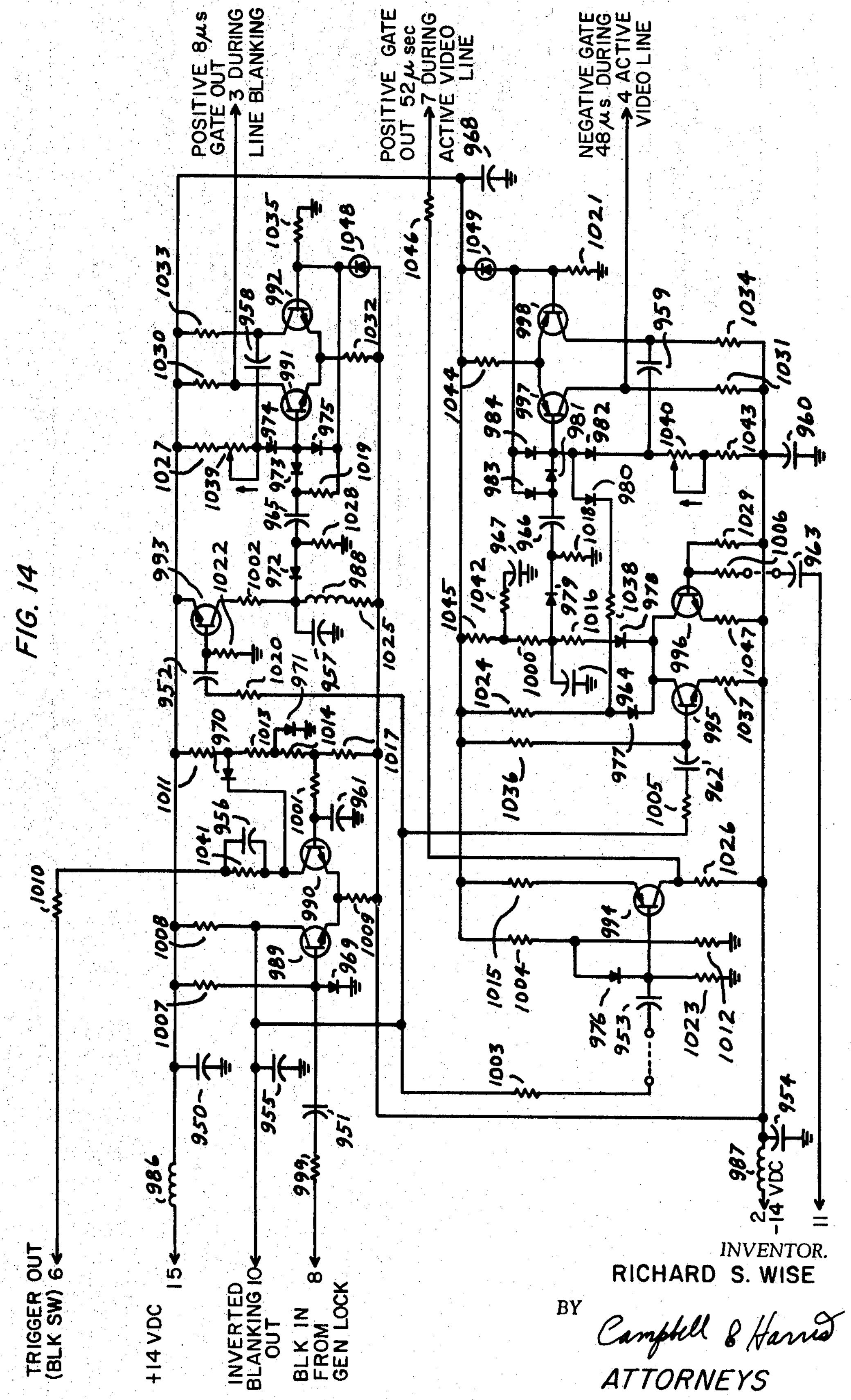

COMPONENTS OF FIGURE 14—Capacitors: 950, 951, 952, 953, 954–15 μf; 955, 956–47 pf; 957–1,000 pf; 958–330 pf; 959–910 pf; 960–0.002 : 961–470 pf; 962, 963–6.8 μf; 964, 965, 966–680 pf; 967–0.012 μf; 968–0.01 μf. Diodes: 969 to 978, 979, 980, 981, 982, 983–A9201; 984–1N270. Inductors: 986, 987–1 UHF; 988–10 mh. Transistors: 989, 990, 991, 992–A9312; 993, 994–2N3638A; 995, 996–2N3565; 997, 998–2N3251; 999, 1000, 1001, 1002, 1003, 1004, 1005, 1006–1 K; 1 7–39 K; 1008–560; 1009–1.2 K; 1010–150; 1011, 1012–5.6 K; 1013–3.3 K; 1014, 1015, 1016–470; 1017, 1018, 1019–10 K; 1020, 1021–2.2 K; 1022, 1023, 1024–100 K; 1025–4.7 K; 1026–47 K; 1027, 1028, 1029–22 K; 1030, 1031–1.5 K; 1032–270; 1033, 1034–2.2 K; 1035–6.8 K;

1036–220 K; 1037–330; 1038–33 K; 1039–10 K; (variable); 1040–20 K (variable); 1041–1.3 K; 1042–4.3 K; 1043–56 K; 1044–300; 1045–8.2 K; 1046–47 ohms; 1047–100; 1048, 1049–1N751A.

COMPONENTS OF FIGURE 15—Capacitors: 1052, 1053, 1054–15 $\mu$f; 1055, 1056, 1057–0.005 $\mu$f; 1058, 1059, 1060, 1061–68 $\mu$f. Diodes: 1062, 1063, 1064, 1065–A9201; 1066–1N748A. Inductors: 1067, 1068–1 $\mu$h. Transistors: 1069, 1070, 1071, 1072–A9312; Resistors: 1074, 1075–2.2 K; 1076, 1077, 1078, 1079–22 K; 1080, 1081–47 K; 1082, 1083–270; 1084, 1085–200 ohm; 1086, 1087–220; 1088-820.

In operation, the device of this invention receives an incoming video signal and automatically passes sync and color bursts at unity gain while exercising gain control of the active video scan and setup control of the entire signal. Should the signal level fall below a predetermined threshold, then the active scan is automatically held at unity gain until the signal again builds to a satisfactory level. Operation in detail is described hereinabove.

From the foregoing, it can be seen that the device of this invention provides a heretofore unknown means for holding one portion of a signal at unity gain while exercising gain control of another portion of said signal, while, at the same time, controlling setup of the entire signal. In addition, unity gain is established to prevent excessive distortion when the signal level falls below a predetermined minimum.

I claim:

1. An electronic automatic gain control device, comprising:
input means for receiving an input signal;
channel separation means for diverting said signal into first and second channels;
gain varying means in said first channel for varying the gain of said signal in said first channel;
means for recombining the signal on each of said channels so that a portion of the combined signal is from each of said channels;
output means for receiving said combined signal; and
feedback means connected between said output means and said gain varying means for automatically controlling the gain of that portion of said combined signal derived from said first channel.

2. The device of claim 1 wherein said means for recombining the signal on each of said channels is a switch that permits passage of only predetermined portions of the signal on each channel.

3. The device of claim 1 wherein said feedback means includes peak-white to peak-black detection means for producing a DC control voltage that is coupled back to said gain varying means to control the gain thereof.

4. An electronic gain control device, comprising:
input means for receiving an input signal;
channel separation means for diverting said signal into first and second channels;
means for establishing substantially unity gain in said first channel;
gain varying means for varying the gain of said signal in said second channel;
means for recombining the signal on each of said channels so that a portion of the combined signal is from each of said channels;
output means for receiving said combined signal;
and feedback means connected between said output means and said gain varying means for controlling the gain of that portion of said combined signal from said second channel without affecting the substantially unity gain of that portion of said combined signal from said first channel.

5. The device of claim 4 wherein said signal is a television video signal and wherein the blanking interval of said signal is coupled through said first channel and the active video of said signal is coupled through said second channel.

6. The device of claim 5 wherein sync pulses and color burst are coupled through said first channel to thereby hold the same at substantially unity gain.

7. An electronic automatic gain control device, comprising:
input means for receiving an input signal;
channel separation means for diverting said signal into first and second channels;
gain varying means in said first channel for varying the gain of said signal in said first channel;
means for recombining the signal on each of said channels so that a portion of the combined signal is from each of said channels;
output means for receiving said combined signal;
feedback means connected between said output means and said gain varying means for automatically controlling the gain of that portion of said combined signal derived from said first channel;
sensing means for sensing absence of an input signal of predetermined minimum magnitude; and
means connected with said sensing means for disrupting gain controlling feedback from said output means to said gain varying means when said input signal is less than said predetermined magnitude.

8. The device of claim 7 further characterized by preset unity gain means, and wherein said last named means connects said gain varying means with said preset unity gain means whenever feedback to said gain varying means from said output means is disrupted.

9. The device of claim 7 wherein said sensing means includes a fade detector the output of which energized switch actuating relay means, said relay controlled switch being connected in said feedback path.

10. An electric signal control device, comprising:
input means for receiving an input signal;
DC restoration means for receiving said input signals;
output means for receiving said signal from said DC restoration means;
feedback means connected between said output means and said DC restoration means for automatically controlling the setup level of said signal;
channel separation means for dividing said signal into two channels one of which includes said DC restoration means; and
means for recombining the signal on each said channel and coupling said combined signal to said output means, said combined signal including a portion of the signal on each said channel.

11. The device of claim 10, wherein said other channel also includes DC restoration means, and wherein said feedback is coupled to both of said DC restoration means.

12. An electronic signal control device, comprising:
input means for receiving an input signal;
gain varying means for varying the gain of said signal;
DC restoration means;
first feedback means connected to said gain varying means for automatically controlling the gain of said signal; and
second feedback means connected to said DC restoration means for controlling the setup level of said signal.

13. The device of claim 12 wherein said first feedback means includes a peak-white to peak-black detector and wherein said second feedback includes a setup detector.

14. The device of claim 12 wherein said DC restoration means includes means for sensing the DC level of said signal and varying the same in response to said signal from said second feedback means.

15. The device of claim 12 wherein said second feedback means includes means for causing a push-pull DC control voltage to be coupled to said DC restoration means.

16. An electronic signal control device, comprising:
input means for receiving an input signal;
channel separation means for diverting said signal into first and second channels;
gain varying means for varying the gain of said signal on said first channel;

DC restoration means in each of said channels;

means for recombining the signal on each of said channels so that a portion of the combined signal is from each of said channels;

output means for receiving said combined signal;

first feedback means connected to said gain varying means for automatically controlling the gain of that portion of said combined signal derived from said first channel; and second feedback means connected to said DC restoration means for controlling the setup level of said combined signal.

17. The device of claim 16 wherein the signal in said second channel is held to substantially unity gain and wherein said means for recombining the signal on each of said channels includes switching means for passing only a predetermined portion of the signal on each of said channels.

18. An electronic signal control device, comprising:

input means for receiving an input signal;

channel separation means for diverting said signal into first and second channels;

means for establishing substantially unity gain in said first channel;

gain varying means for varying the gain of said signal in said second channel;

unity gain means;

control means for detecting absence of an input signal of predetermined minimum magnitude;

DC restoration means in each of said channels;

switching means for recombining the signal on each of said channels so that a portion of the combined signal is from each of said channels;

output means for receiving said combined signal;

first feedback means connected between said output means and said gain varying means for automatically controlling the gain of that portion of the combined signal derived from said second channel, said feedback means including switch means controlled by said control means for disrupting feedback from said output means and connecting said gain varying means to said unity gain means when the input signal falls below said predetermined minimum magnitude; and second feedback means connected between said output means and said DC restoration means for controlling the setup of said combined signal.

19. The device of claim 18 further characterized by timing means connected to said switching means and said first and second feedback means for controlling selection of the combined signal from said first and second channels and selection of the portion of the combined signal sampled for feedback purposes.

20. The device of claim 19 further characterized by clamp means controlled by said timing means and establishing a DC level on said DC restoration means.

21. The device of claim 19 wherein said timing means produces control signals whereby the feedback to said first and second feedback means is sampled at different times.

22. An electronic video signal control device, comprising:

input means for receiving a video input signal having a blanking interval and an active scan interval;

means for separating said incoming signal into first and second channels;

isolation amplifying means in said first channel, said signal in said first channel being held to substantially unity gain;

attenuation means in said second channel;

first DC restoration means in said first channel;

second DC restoration means in said second channel;

switching means connected to said first and second DC restoration means;

output means connected to said switching means;

switching control means for determining switching of said switching means between said first and second channels whereby the combined output signal includes the blanking interval from said first channel and the active video from said second channel;

first feedback means connected between said output means and said attenuation means for automatically controlling the gain of the video signal in said second channel, said first feedback means including a switch;

unity gain means;

signal fade control means connected to receive said input signal and cause said switch in said first feedback means to disrupt said first feedback path and connect said attenuation means to said unity gain means whenever the level of said input video signal falls below a predetermined minimum value;

second feedback means connected between said output means and said first and second DC restoration means for controlling the setup of said combined signal; and timing means for controlling said switching means and said first and second feedback means.

23. The device of claim 22 wherein said first channel includes delay means to assure proper phasing of said signal s when combined by said switch means, and wherein said second channel includes compensation means for providing uniform signal delay regardless of attenuation of said attenuation means.

24. An electronic video signal control device, comprising:

input means to receive a video broadcast signal having a blanking interval and an active scan interval;

means for separating said incoming signal into first and second channels;

isolation amplifying means in said first channel to establish substantially unity gain therein;

attenuation means in said second channel for varying the gain of said signal therein;

first DC restoration means in said first channel;

second DC restoration means in said second channel;

gating means for receiving said signals from said first and second channels and passing the blanking interval of the signal on said first channel and the active video of the signal on the second channel so that a combined output signal is produced;

output means for receiving said combined output signal;

a first detector connected with said output means for producing a DC signal corresponding to the active video peak-white DC level;

a second detector connected with said output means for producing a DC signal corresponding to the active video peak-black DC level;

a third detector connected with said output means for producing a DC signal corresponding to the video blanking DC level;

means for receiving said DC signals from said first and second detectors and producing a DC signal that is coupled to said attenuation means to automatically control the gain of the signal in said second channel;

means for receiving the output from said second detector and said third detector and producing DC signals that are coupled to said first and second DC restoration means, respectively, to automatically control setup of said combined output signal;

timing means; and means connected between said timing means and said first, second and third detectors for causing sampling of said output signal at predetermined different times.

UNITED STATES PATENT OFFICE

CERTIFICATE OF CORRECTION

Patent No. 3,558,816 Dated January 26, 1971

Inventor(s) Richard S. Wise

It is certified that error appears in the above-identified patent and that said Letters Patent are hereby corrected as shown below:

Claim 13, line 3, after "feedback" insert "means".

Signed and sealed this 7th day of January 1975.

(SEAL)
Attest:

McCOY M. GIBSON JR.
Attesting Officer

C. MARSHALL DANN
Commissioner of Patents